United States Patent
Onaka

(10) Patent No.: US 9,645,314 B2
(45) Date of Patent: May 9, 2017

(54) OPTICAL DEVICE

(71) Applicant: FUJITSU LIMITED, Kawasaki-shi, Kanagawa (JP)

(72) Inventor: Miki Onaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/176,469

(22) Filed: Jun. 8, 2016

(65) Prior Publication Data

US 2016/0282559 A1  Sep. 29, 2016

Related U.S. Application Data

(60) Division of application No. 14/727,175, filed on Jun. 1, 2015, now abandoned, which is a continuation of
(Continued)

(51) Int. Cl.
*G02B 6/28* (2006.01)
*G02B 6/02* (2006.01)
(Continued)

(52) U.S. Cl.
CPC ....... *G02B 6/2817* (2013.01); *G02B 6/02042* (2013.01); *G02B 6/3806* (2013.01); *G02F 1/1337* (2013.01); *G02F 1/13318* (2013.01); *G02F 1/13439* (2013.01); *G02F 1/136277* (2013.01); *H01S 3/06737* (2013.01); *H01S 3/06754* (2013.01); *H01S 3/0941* (2013.01); *H01S 3/094069* (2013.01);
(Continued)

(58) Field of Classification Search
CPC ............ G02B 6/02042; G02B 6/2817
See application file for complete search history.

(56) References Cited

U.S. PATENT DOCUMENTS

| 5,512,760 A | 4/1996 | Horijon et al. |
|---|---|---|
| 6,275,623 B1 | 8/2001 | Brophy et al. |

(Continued)

FOREIGN PATENT DOCUMENTS

| EP | 2722697 A1 | 4/2014 |
|---|---|---|
| JP | 05-241209 | 9/1993 |

(Continued)

OTHER PUBLICATIONS

Office Action issued by the Japanese Patent Office on Jun. 7, 2016 in corresponding Japanese patent application No. 2014-551814.
(Continued)

*Primary Examiner* — Omar R Rojas
(74) *Attorney, Agent, or Firm* — Staas & Halsey LLP

(57) ABSTRACT

An optical device includes a first fiber; a liquid crystal member configured to have liquid crystal pixels that reflect light output from the first fiber; a second fiber configured to have a core to which a first order light ray in the light reflected by the liquid crystal member is optically connected; a light receiving circuit configured to receive higher order light rays in the light reflected by the liquid crystal member; and a control circuit configured to control based on a light receiving result of the light receiving circuit, efficiency of optical connection of the first order light ray to the core of the second fiber, by varying an angle of the light reflected by the liquid crystal member.

1 Claim, 20 Drawing Sheets

Related U.S. Application Data application No. PCT/JP2012/082430, filed on Dec. 13, 2012.

(51) Int. Cl.

| | | |
|---|---|---|
| *H04Q 11/00* | (2006.01) | |
| *H01S 3/067* | (2006.01) | |
| *H01S 3/094* | (2006.01) | |
| *G02F 1/1337* | (2006.01) | |
| *G02F 1/1343* | (2006.01) | |
| *H01S 3/13* | (2006.01) | |
| *H01S 3/136* | (2006.01) | |
| *H01S 3/16* | (2006.01) | |
| *G02B 6/38* | (2006.01) | |
| *G02F 1/133* | (2006.01) | |
| *G02B 6/35* | (2006.01) | |
| *G02F 1/1362* | (2006.01) | |
| *H01S 3/0941* | (2006.01) | |

(52) U.S. Cl.
CPC .......... *H01S 3/1305* (2013.01); *H01S 3/136* (2013.01); *H01S 3/1608* (2013.01); *H04Q 11/0005* (2013.01); *G02B 6/3556* (2013.01); *G02F 2001/136281* (2013.01); *G02F 2203/02* (2013.01); *G02F 2203/48* (2013.01); *G02F 2203/58* (2013.01); *H01S 3/09415* (2013.01); *H04Q 2213/1301* (2013.01)

(56) References Cited

U.S. PATENT DOCUMENTS

| 7,010,211 | B2 | 3/2006 | Cohen |
| 9,140,850 | B2 * | 9/2015 | Mimura ............ H01S 3/06737 |
| 2003/0021534 | A1 | 1/2003 | Fujieda |
| 2004/0120683 | A1 | 6/2004 | Cohen |
| 2005/0100277 | A1 | 5/2005 | Frisken |
| 2006/0024063 | A1 | 2/2006 | Onaka et al. |
| 2006/0215976 | A1 | 9/2006 | Singh et al. |
| 2013/0108205 | A1 | 5/2013 | Oguri et al. |

FOREIGN PATENT DOCUMENTS

| JP | 10-125988 | 5/1998 |
| JP | 2003-043234 | 2/2003 |
| JP | 2004-522188 | 7/2004 |
| JP | 2006-049405 | 2/2006 |
| JP | 2006-285234 | 10/2006 |
| JP | 2009-168840 | 7/2009 |
| JP | 2012-083404 | 4/2012 |
| WO | WO 01/04674 A1 | 1/2001 |
| WO | WO 2004/063684 A1 | 7/2004 |
| WO | WO 2012/173271 A1 | 12/2012 |

OTHER PUBLICATIONS

International Search Report mailed Mar. 26, 2013 in corresponding international application PCT/JP2012/082430.

International Preliminary Report on Patentability mailed Mar. 26, 2013 in corresponding international application PCT/JP2012/082430.

Yasuki Sakurai et al. "LCOS-Based 4×4 Wavelength Cross-Connect Switch for Flexible Channel Management in ROADMs" 2011 Optical Society of America, Mar. 6, 2011.

Extended European Search Report dated Dec. 1, 2015 in corresponding European Patent Application No. 12889920.0.

Election Requirement issued Dec. 24, 2015 in U.S. Appl. No. 14/727,175.

Office Action issued Mar. 8, 2016 in U.S. Appl. No. 14/727,175.

U.S. Appl. No. 14/727,175, filed Jun. 1, 2015, Miki Onaka, Fujitsu Limited.

* cited by examiner

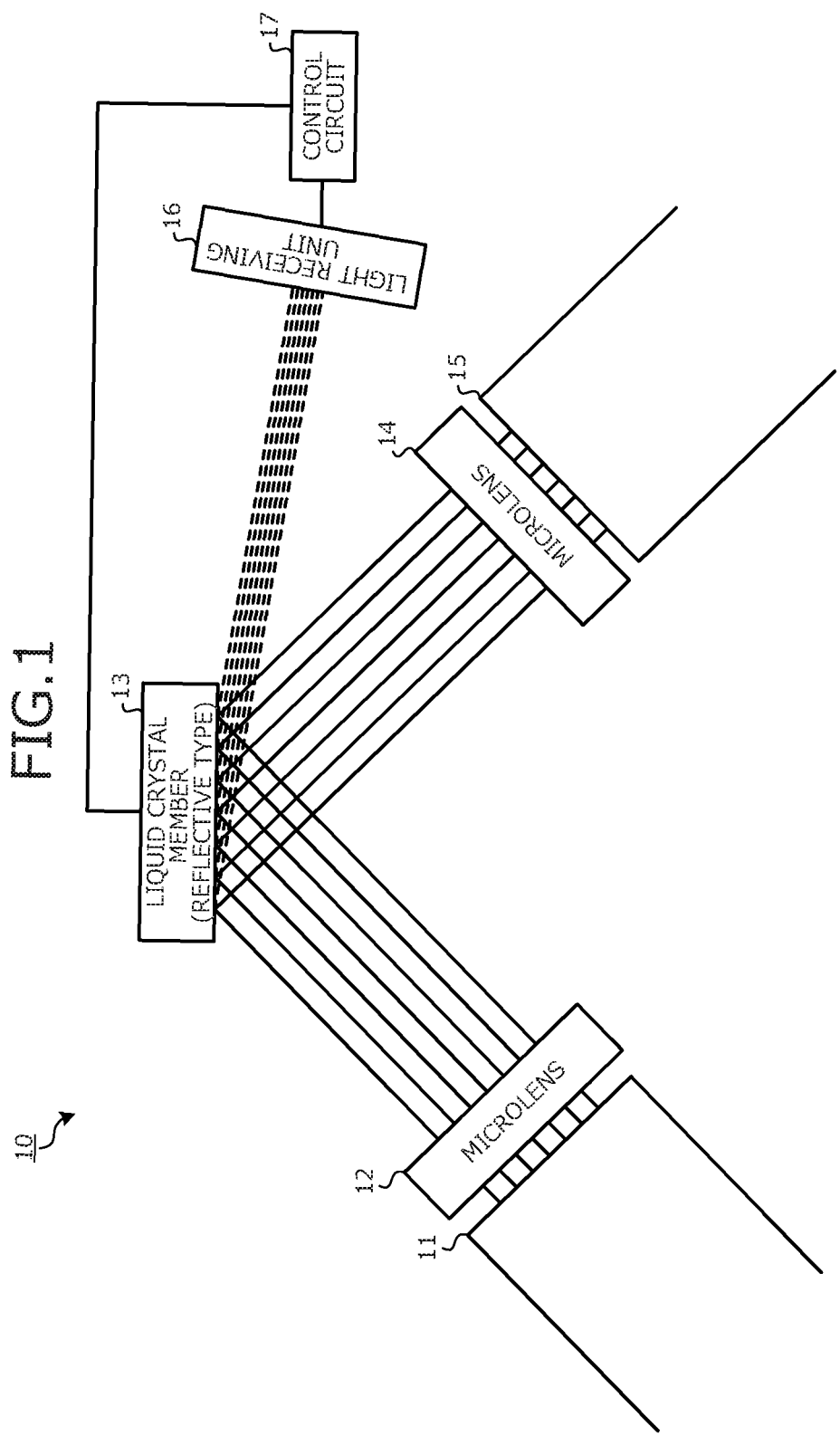

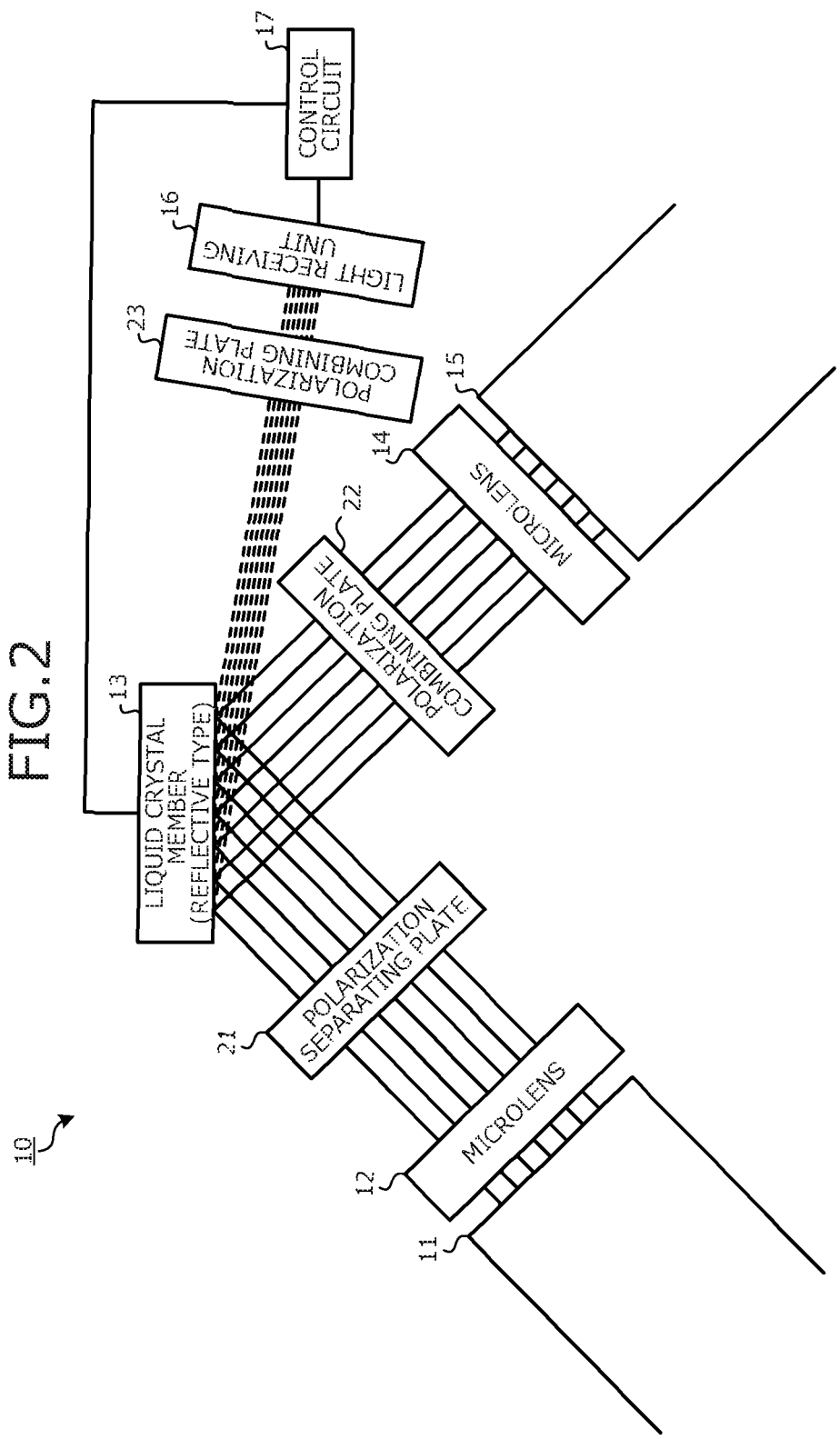

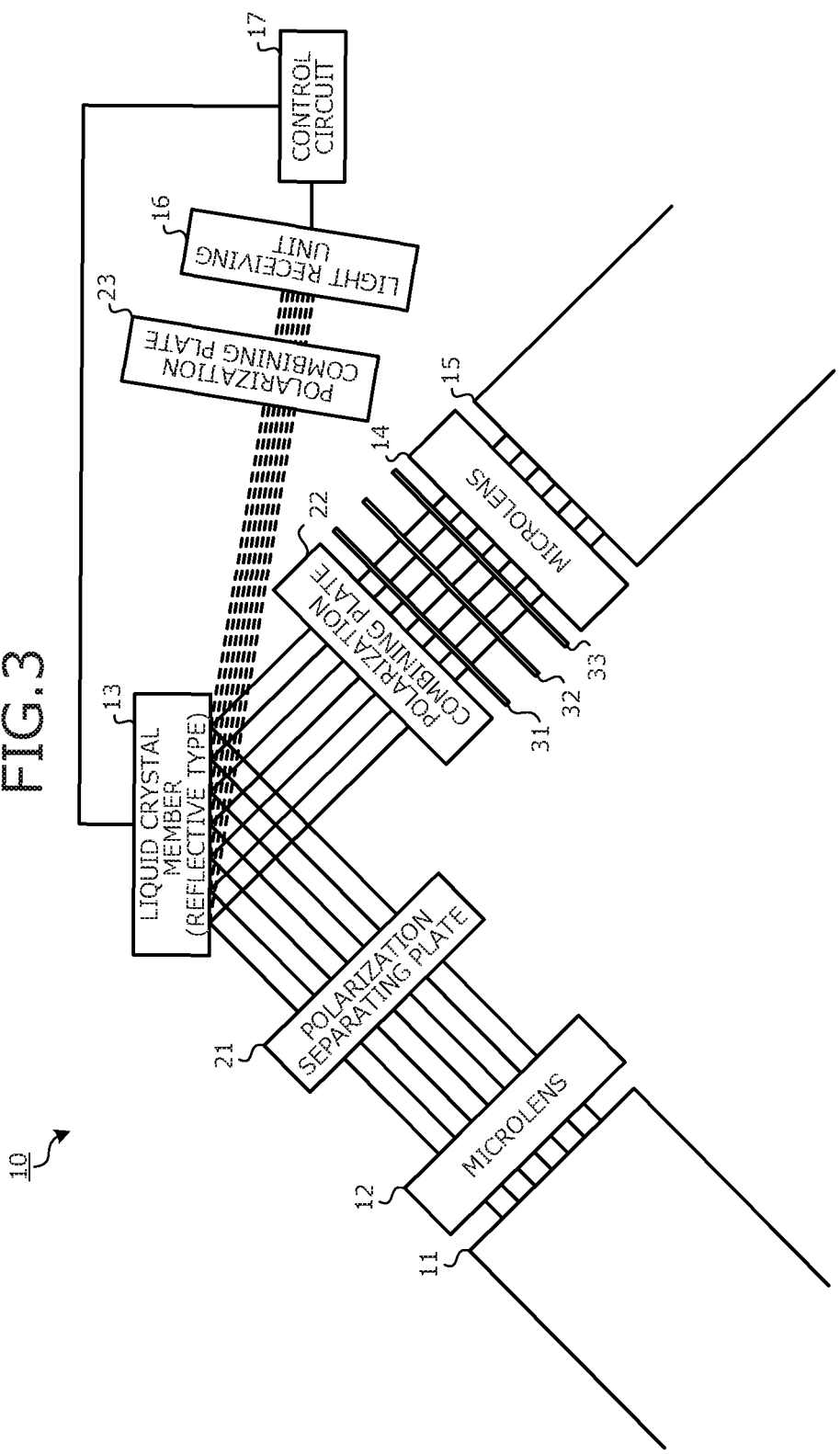

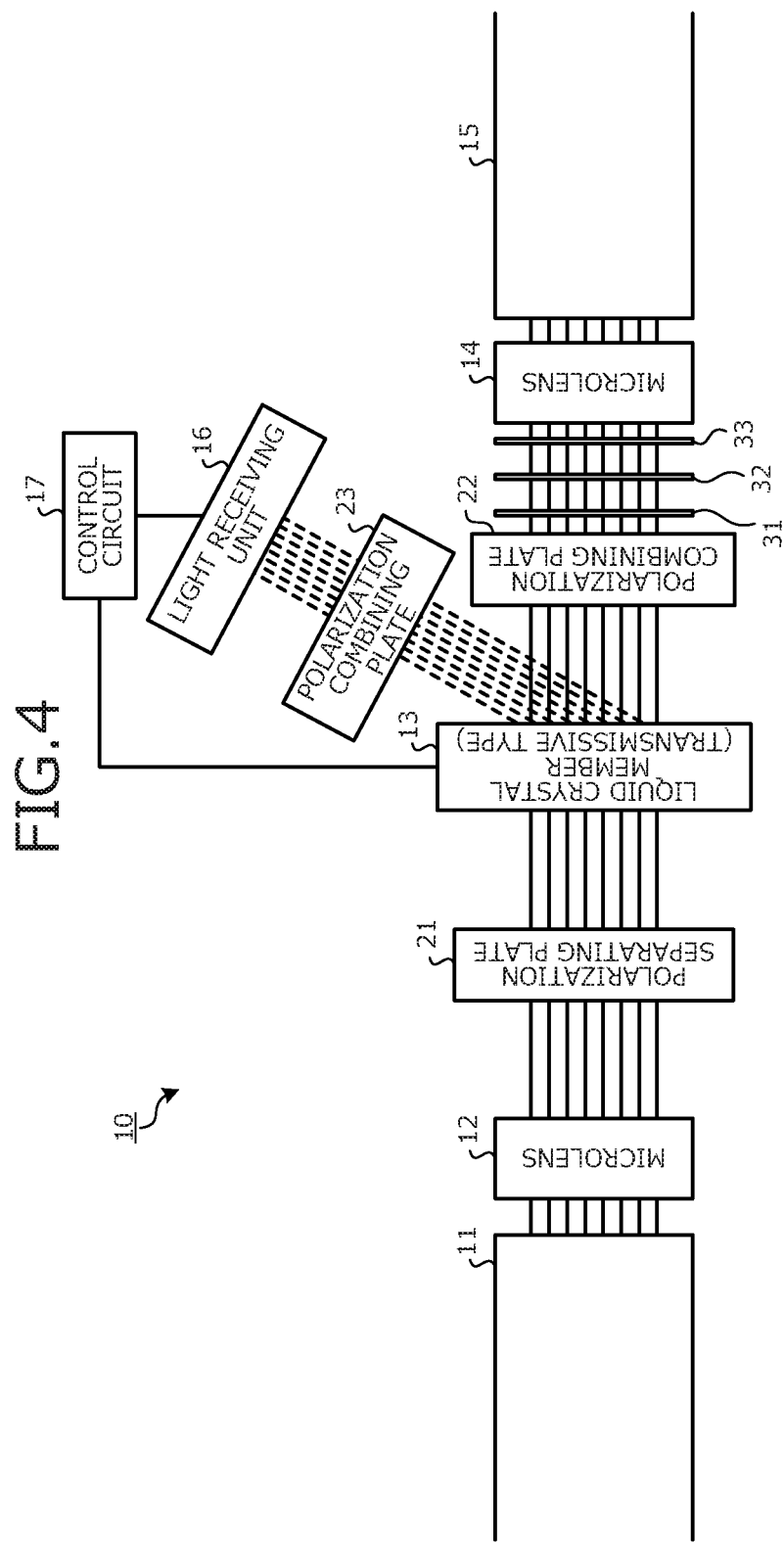

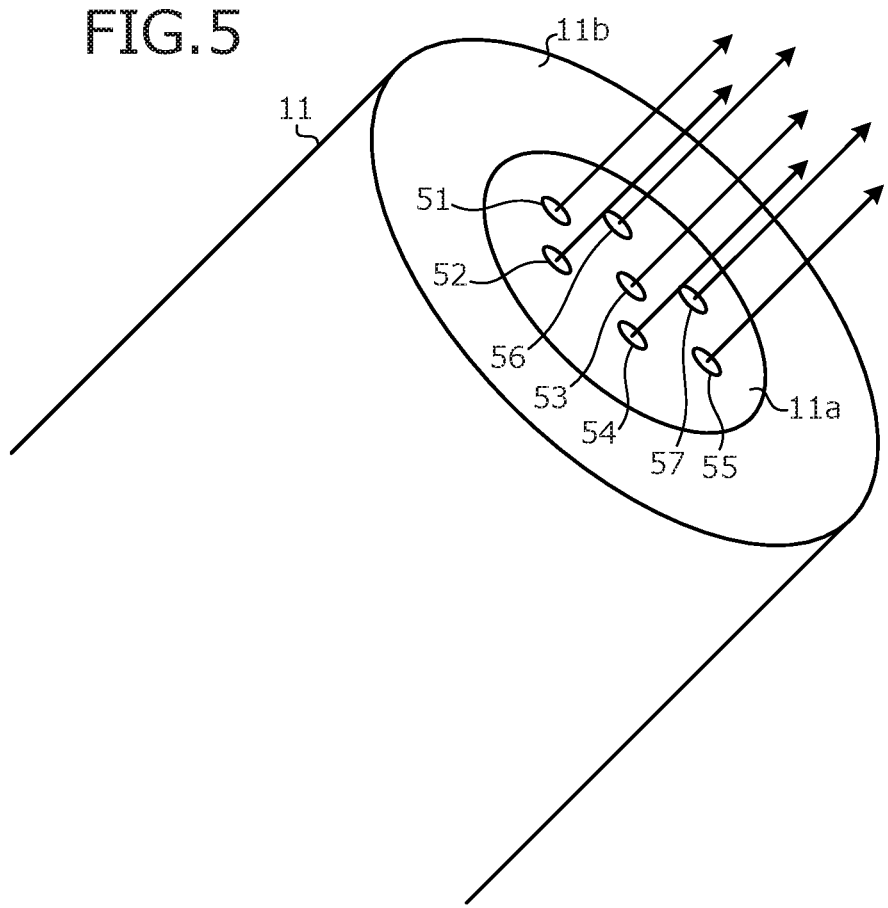

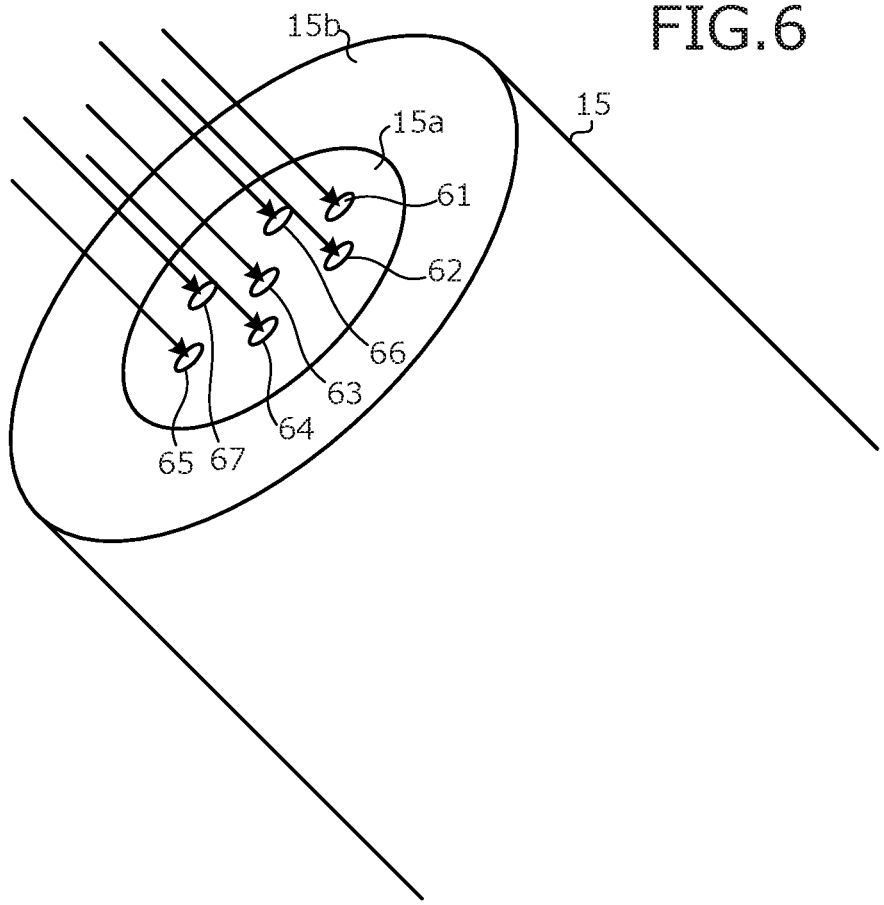

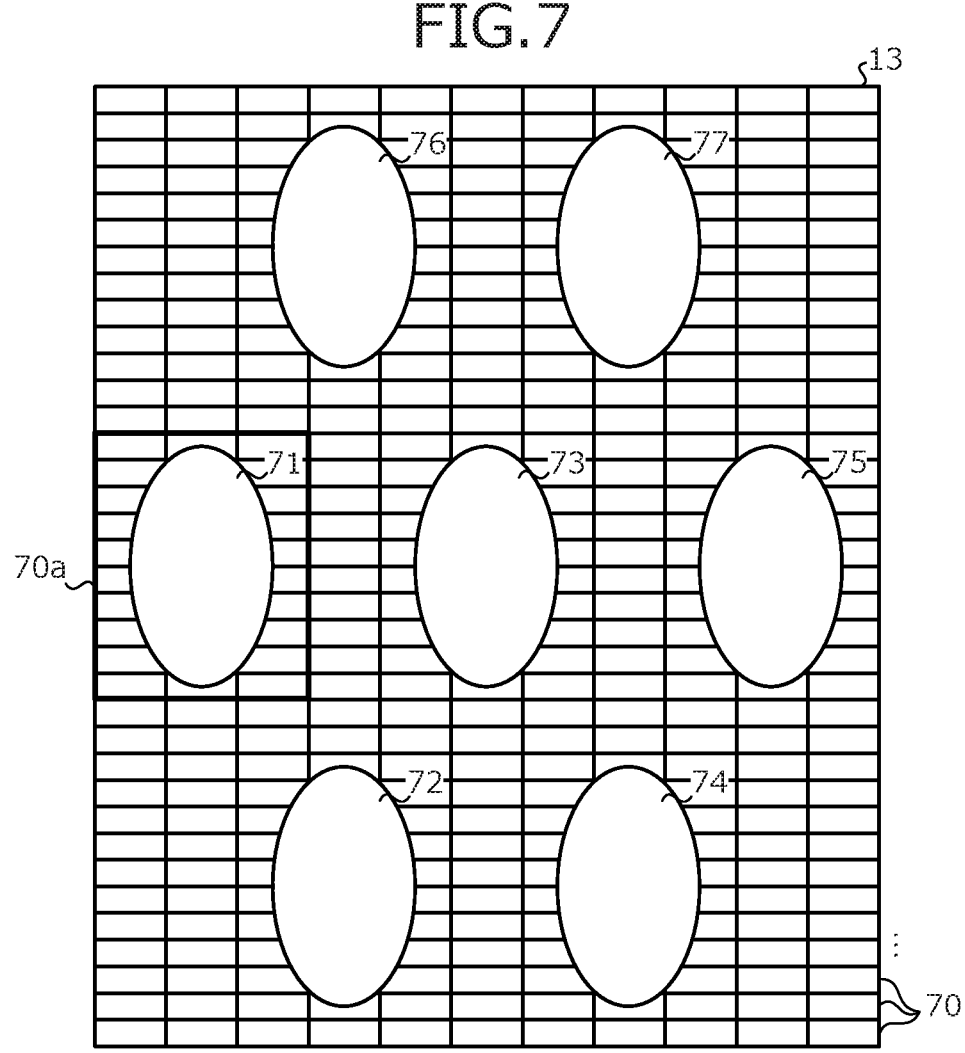

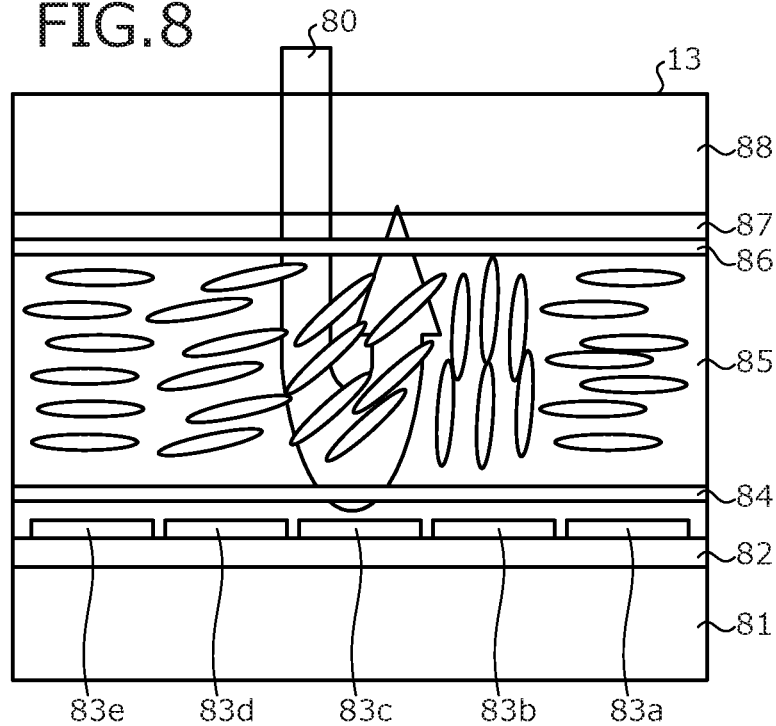
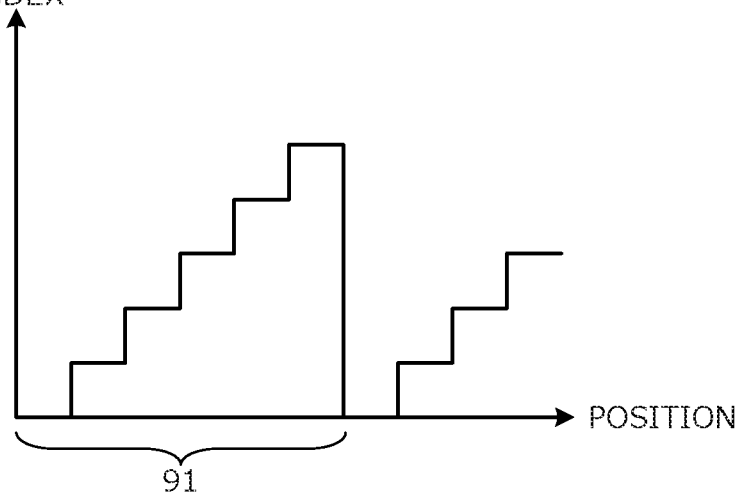

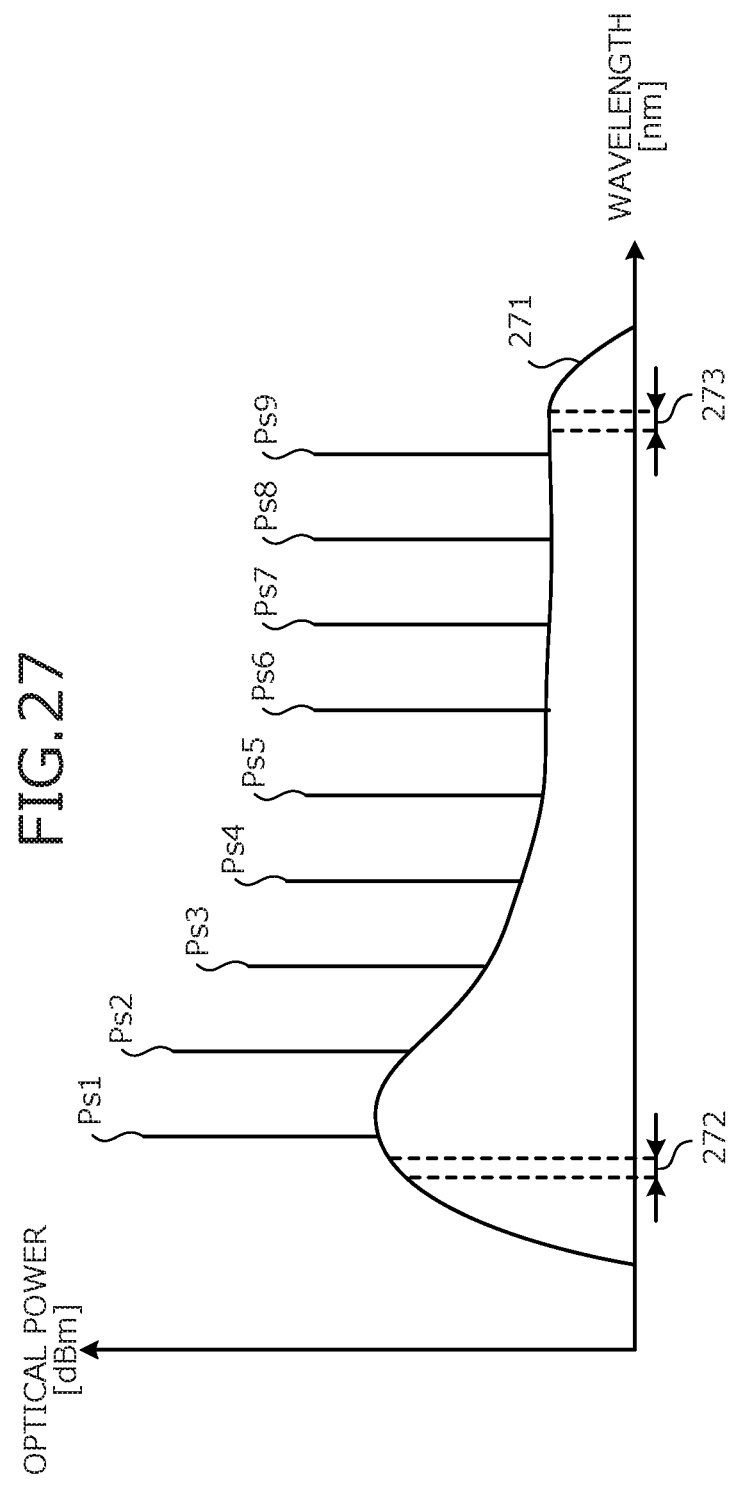

OPTICAL DEVICE

CROSS REFERENCE TO RELATED APPLICATIONS

This application is a divisional of U.S. application Ser. No. 14/727,175 filed Jun. 1, 2015, which is a continuation application of International Application PCT/JP2012/082430, filed on Dec. 13, 2012 and designating the U.S., the entire contents of which are incorporated herein by reference.

FIELD

The embodiment discussed herein is related to an optical device.

BACKGROUND

Conventionally, when light is amplified, not only is amplification performed simply, but attenuation is also adjusted for each optical signal to control gain and output, for example. For such adjustment, for example, an optics element (brancher) such as a branch coupler that extracts a portion of an optical signal is used. Further, an attenuator that can adjust the optical attenuation of the light of the optical signal is used. For an example of such a technique, refer to Japanese Laid-Open Patent Publication No. 2006-49405.

Nonetheless, with the conventional techniques above, a problem arises in that to measure the power of output light, a portion of the output light has to be removed and attenuation cannot be efficiently controlled. In cases where the fiber is a multicore fiber, portions of the light are removed (extracted) from plural adjacent locations and thus, the degree of freedom of the extraction diminishes, making the above problem more remarkable.

To solve the problem above related to the conventional techniques, one object of the present invention is to provide an optical device capable of efficiently controlling attenuation.

SUMMARY

According to an aspect of an embodiment, an optical device includes a first fiber; a liquid crystal member configured to have liquid crystal pixels that reflect light output from the first fiber; a second fiber configured to have a core to which a first order light ray in the light reflected by the liquid crystal member is optically connected; a light receiving circuit configured to receive higher order light rays in the light reflected by the liquid crystal member; and a control circuit configured to control based on a light receiving result of the light receiving circuit, efficiency of optical connection of the first order light ray to the core of the second fiber, by varying an angle of the light reflected by the liquid crystal member.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting a first configuration example of an optical attenuating apparatus according to an embodiment;

FIG. 2 is a diagram depicting a second configuration example of the optical attenuating apparatus according to the embodiment;

FIG. 3 is a diagram depicting a third configuration example of the optical attenuating apparatus according to the embodiment;

FIG. 4 is a diagram depicting a fourth configuration example the optical attenuating apparatus according to the embodiment;

FIG. 5 is a diagram depicting and example of a first fiber;

FIG. 6 is a diagram depicting an example of a second fiber;

FIG. 7 is a diagram depicting an example of a light incident surface of a liquid crystal member;

FIG. 8 is a diagram depicting an example of configuration of the liquid crystal member;

FIG. 9 is a diagram depicting an example of transmittance of each position on an incident surface of the liquid crystal member;

FIG. 27 is a diagram depicting an example of bandwidth for monitoring optical power in the first fiber.

DESCRIPTION OF EMBODIMENTS

Figure 10:
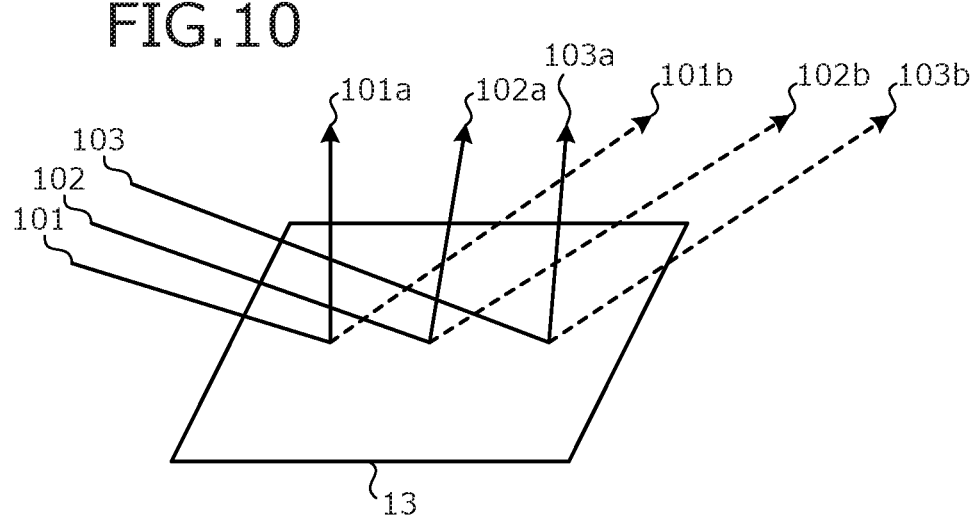
FIG. 10 is a diagram depicting an example of reflection of light at the liquid crystal member.

An embodiment of an optical device according to the present invention will be described in detail with reference to the accompanying drawings.

FIG. 1 is a diagram depicting a first configuration example of an optical attenuating apparatus according to an embodiment. As depicted in FIG. 1, an optical attenuating apparatus 10 according to the embodiment, for example, is an optical device that includes a first fiber 11, a microlens 12, a liquid crystal member 13, a microlens 14, a second fiber 15, a light receiving unit 16, and a control circuit 17.

The first fiber 11, for example, is a multicore fiber having plural cores and capable of transmitting plural light rays simultaneously. The first fiber 11 outputs to the microlens 12, the light rays transmitted by the cores.

The microlens 12 transmits the light rays output from the cores of the first fiber 11, and outputs the light rays to the liquid crystal member 13. For example, the microlens 12 is a collimating lens group that collimates the respective light rays output from the cores of the first fiber 11 and outputs the collimated light to the liquid crystal member 13.

In the liquid crystal member 13, pixels are formed whose refractive index varies according to the voltage applied. For example, the liquid crystal member 13 is realized by forming the pixels on a signal chip. The liquid crystal member 13 depicted in FIG. 1 is a reflective liquid crystal cell that reflects the light rays output from the microlens 12. For example, the liquid crystal member 13 can be realized by a drive IC liquid crystal element such as LCOS.

For example, the technology of non-patent literature (Yasuki Sakurai, Masahiro Kawasugi, Yuji Hotta, MD. Saad Khan, Hisashi Oguri, Katsuyoshi Takeuchi, Sachiko Michihata, and Noboru Uehara, "LCOS-Based 4×4 Wavelength Cross-Connect Switch For Flexible Channel Management in ROADMs", June 2011) can be applied as the liquid crystal member 13.

The reflected light of the liquid crystal member 13 includes first order light rays and higher order light rays (second order light ray, third order light ray, . . . ). According to Fourier optics image formation, the reflection angle of higher order light rays is greater than that of first order light rays and therefore, first order light rays and higher order light rays are output in relatively different directions. First order light rays in the light reflected by the liquid crystal member 13 are output to the microlens 14. Further, higher order light rays in the light reflected by the liquid crystal member 13 are output to the light receiving unit 16. The voltages applied to the pixels of the liquid crystal member 13 are controlled by the control circuit 17. Control of the liquid crystal member 13 by the control circuit 17 will be described hereinafter.

The microlens 14 transmits the light rays (first order light rays) output from the liquid crystal member 13 and outputs the light rays to the second fiber 15. For example, the microlens 14 is a collecting lens group that collects the respective light rays output from the liquid crystal member 13 and inputs the collected light into the cores of the second fiber 15.

The second fiber 15, for example, is a multicore fiber having plural cores and capable of transmitting plural light rays simultaneously. The light rays output from the microlens 14 are optically connected to the cores of the second fiber 15, which outputs the light rays. Thus, the light rays input through the cores of the first fiber 11 can be output by the respective cores of the second fiber 15. Further, the power of the light rays output from the second fiber 15 varies according to the efficiency of the optical connection of the light rays from the microlens 14 to the cores of the second fiber 15.

The light receiving unit 16 receives the light rays (higher order light rays) output from the liquid crystal member 13. For example, the light receiving unit 16 is optical receiving devices respectively corresponding to the light rays output from the cores the first fiber 11 and reflected by the liquid crystal member 13. The light receiving unit 16 outputs to the control circuit 17, signals that correspond to the power of the received light rays.

The control circuit 17 controls the voltage applied to the pixels of the liquid crystal member 13, based on the signals output from the light receiving unit 16, and thereby controls the reflection angle of the light rays at the liquid crystal member 13. For example, the control circuit 17 controls the voltage applied to the pixels of the liquid crystal member 13 such that for each light ray incident on the liquid crystal member 13 from the microlens 12, the equiphase plane of the light beam becomes a given value.

As a result, the reflection angle of first order light rays and higher order light rays at the liquid crystal member 13 also vary. Consequently, the efficiency of the optical connection of the first order light rays to the cores of the second fiber 15 varies, enabling the attenuation of the light output from the second fiber 15 to be varied. Further, the reflection angle of the first order light rays together with the reflection angle of the higher order light rays also vary and therefore, the efficiency of the optical connection of the higher order light rays at the light receiving unit 16 varies. The optical connection efficiency of the first order light rays at the second fiber 15 and the optical connection efficiency of the higher order light rays at the light receiving unit 16 have a constant relation, thereby enabling the power of the light output from the second fiber 15 to be monitored based on signals obtained by the light receiving unit 16.

In this manner, the optical attenuating apparatus 10 reflects the light rays from the first fiber 11 by the liquid crystal member 13 to vary the efficiency of the optical connection to the second fiber 15, enabling the power of the light rays to be individually controlled. Further, by receiving the higher order light rays output from the liquid crystal member 13, the output power can also be monitored.

For example, in a configuration employing a micro electro mechanical systems (MEMS) mirror, individual control of the output angle of neighboring light rays output from the cores of a multicore fiber is difficult. In contrast, in the optical attenuating apparatus 10, for example, by employing the liquid crystal member 13 that can be realized by a single chip through micro-scale liquid crystal technology, the output angle of the neighboring light rays output from the cores of the first fiber 11 can be individually controlled.

Further, for example, this configuration is simple to implement compared to a configuration in which light rays transmitted by a multicore fiber are branched to plural single core fibers and the power thereof is controlled by respective attenuators.

Further, since the higher order light rays output from the liquid crystal member 13 are monitored, the effect thereof on the light rays output from the second fiber 15 is suppressed, enabling the power of each light ray output from the second fiber 15 to be monitored. Further, since a configuration to remove a portion of the light rays output from the second fiber 15 need not be provided, reductions in the size of the apparatus can be facilitated.

In this manner, the optical attenuating apparatus 10 enables optical attenuation to be controlled efficiently.

FIG. 2 is a diagram depicting a second configuration example of the optical attenuating apparatus according to the embodiment. In FIG. 2, portions identical to those depicted in FIG. 1 are given the same reference numerals used in FIG. 1 and description thereof is omitted hereinafter. As depicted in FIG. 2, the optical attenuating apparatus 10 may further include a polarization separating plate 21 and polarization combining plates 22 and 23, in addition to the configuration depicted in FIG. 1.

The polarization separating plate 21 (separator) separates the light output from the first fiber 11 and incident on the liquid crystal member 13, into respectively different polarized wave components. More specifically, the polarization separating plate 21 separates the light rays output from the microlens 12 into polarized wave components that are orthogonal to each other and outputs the polarized wave components to the liquid crystal member 13. As a result, the light rays output from the cores of the first fiber 11 can be separated respectively into polarized wave components, incident on the liquid crystal member 13.

The polarization combining plate 22 (first combiner) combines the first order light rays of the polarized wave components that are reflected by the liquid crystal member 13 and input to the second fiber 15. More specifically, concerning the first order light rays reflected by the liquid crystal member 13 as separated polarized wave components, the polarization combining plate 22 combines the polarized wave components and outputs the combined polarized wave components to the microlens 14.

The polarization combining plate 23 (second combiner) combines the higher order light rays of the polarized wave components that are reflected by the liquid crystal member 13 and incident on the light receiving unit 16. More specifically, concerning the higher order light rays reflected by the liquid crystal member 13 as separated polarized wave components, the polarization combining plate 23 combines the polarized wave components and outputs the combined polarized wave components to the light receiving unit 16. A configuration that omits the polarization combining plate 23 is also possible.

Thus, input light can be separated into orthogonal polarized wave components and the polarized wave components can be incident on the liquid crystal member 13, at different positions thereof. As a result, the liquid crystal member 13 has polarized wave dependency caused by molecular structure anisotropy and even if the polarization state of the light input to the optical attenuating apparatus 10 varies, the polarization state of the light incident on each position of the liquid crystal member 13 does not vary. Thus, variation of loss at the liquid crystal member 13 caused by polarized wave dependency can be suppressed.

FIG. 3 is a diagram depicting a third configuration example of the optical attenuating apparatus according to the embodiment. In FIG. 3, portions identical to those depicted in FIGS. 1 and 2 are given the same reference numerals used in FIGS. 1 and 2, and description thereof is omitted. As depicted in FIG. 3, the optical attenuating apparatus 10 according to the embodiment may further include at least any one among an isolator 31, an optical filter 32, and a prism 33, in addition to the configuration depicted in FIG. 1 or FIG. 2.

The isolator 31 transmits to the second fiber 15, the light rays output from the liquid crystal member 13, and blocks light output from the second fiber 15 side. As a result, light returning from the second fiber 15 side to the first fiber 11 side can be suppressed. The position at which the isolator 31 is provided is not limited to being between the liquid crystal member 13 and the second fiber 15, and for example, may be provided between the first fiber 11 and the liquid crystal member 13.

The optical filter 32 transmits the light rays output from the liquid crystal member 13 and outputs the light rays to the second fiber 15. Further, the optical filter 32 has a loss wavelength property that equalizes the gain of the transmitted light rays. For example, when the first fiber 11 is used as an amplifying medium, the gain wavelength property of the first fiber 11 can be equalized by providing the optical filter 32.

The optical filter 32, for example, can be realized by dielectric multilayers that can be implemented on a single chip and that equalize the gain of the transmitted light rays. The position at which the optical filter 32 is provided is not limited to being between the liquid crystal member 13 and the second fiber 15, and for example, may be provided between the first fiber 11 and the liquid crystal member 13.

For example, when multicore batch pumping by high pumping optical power, such as double cladding pumping, using multimode pumping is used in the first fiber 11, in the first fiber 11, each of the cores operates according to the saturation state, without transmission condition dependency (inverse distribution of rare earth ions is ideally 1). Thus, even if the condition of the input signal varies for each core, the gain of the cores at the first fiber 11 is constant and the gain wavelength property is also constant. Therefore, batch gain equalization by the optical filter 32 having a given loss wavelength property can be performed even without performing gain equalization with respect to each core.

The prism 33 transmits the light rays output from the liquid crystal member 13 and outputs the light rays to the second fiber 15. Further, the prism 33 has a property that compensates the wavelength characteristics of the transmitted light waves. As a result, for example, the light input to the cores of the first fiber 11 is wavelength multiplexed light and even if wavelength characteristics are induced by the refractive index of the liquid crystal member 13, wavelength characteristics of the light rays output from the second fiber 15 can be compensated.

FIG. 4 is a diagram depicting a fourth configuration example the optical attenuating apparatus according to the embodiment. In FIG. 4, portions identical to those depicted in FIGS. 1 to 3 are given the same reference numerals used in FIGS. 1 to 3 and description thereof is omitted. As depicted in FIG. 4, the liquid crystal member 13 may be a transmissive liquid crystal member.

More specifically, the liquid crystal member 13 depicted in FIG. 4 is a transmissive liquid crystal cell that transmits the light rays output from the microlens 12. Accordingly, by controlling the voltage applied to the pixels of the liquid crystal member 13 by the control circuit 17, the output angle of the light rays output from the liquid crystal member 13 can be controlled.

In this manner, the liquid crystal member 13 may be a reflective liquid crystal member (for example, refer to FIGS. 1 to 3), or may be a transmissive liquid crystal member (for example, refer to FIG. 4).

FIG. 5 is a diagram depicting and example of the first fiber. FIG. 5 depicts an optical output surface of the first fiber 11. As depicted in FIG. 5, the first fiber 11 has first cladding 11a and second cladding 11b. In the first cladding 11a, cores 51 to 57 are formed. The cores 51 to 57 are exposed at the output surface of the first fiber 11. Further, for example, the cores 51 to 57 are doped with a rare earth element. In this case, the first fiber 11 is a multicore Erbium doped fiber (EDF) having plural cores doped with the rare earth element.

The light rays transmitted by the cores 51 to 57 may be signal light of a single wavelength or may be wavelength multiplexed light. The first fiber 11 outputs to the microlens 12 (for example, refer to FIGS. 1 to 4), the light rays transmitted by the cores 51 to 57.

FIG. 6 is a diagram depicting an example of the second fiber. FIG. 6 depicts an optical input surface of the second fiber 15. As depicted in FIG. 6, the second fiber 15 has first cladding 15a and second cladding 15b. In the first cladding 15a, cores 61 to 67 are formed. The cores 61 to 67 are exposed at the input surface of the second fiber 15. The light rays (first order light rays) that are output from the cores 51 to 57 (for example, refer to FIG. 5) of the first fiber 11 and reflected at the liquid crystal member 13 are optically connected to the cores 61 to 67. The second fiber 15 outputs the light rays optically connected to the cores 61 to 67.

In FIG. 6, although a case has been described where the second fiber 15 has a double cladding structure, for example, if the second fiber 15 is not used as an amplifying medium, the second fiber 15 may have a single cladding structure. In other words, the second fiber 15 may be structured as a fiber that omits the first cladding 15a and only has the second cladding 15b.

FIG. 7 is a diagram depicting an example of the light incident surface of the liquid crystal member. As depicted in FIG. 7, liquid crystal pixels 70 are formed in the light incident surface of the liquid crystal member 13. Incident light rays 71 to 77 represent the light rays output from the cores 51 to 57 of the first fiber 11 (for example, refer to FIG. 5). The liquid crystal pixels 70 are formed such that the incident light rays 71 to 77 are respectively incident across plural pixels.

For example, the reflection angle of the incident light ray 71 can be adjusted by controlling the refractive index gradient (refractive index difference) of the liquid crystal pixels 70a to which the incident light ray 71 is incident among the liquid crystal pixels 70. Similarly, the reflection angles of the incident light rays 72 to 77 can be adjusted by controlling the refractive index gradient of the pixels to which the incident light rays 72 to 77 are respectively incident among the liquid crystal pixels 70.

For example, on the incident surface of the liquid crystal member 13, a refractive index gradient of the liquid crystal pixels 70a is provided in one direction only and in another direction on the incident surface of the liquid crystal member 13, the refractive index of the liquid crystal pixels 70a is constant. As a result, the reflection angle can be controlled without dispersion of the light incident on the liquid crystal member 13.

FIG. 8 is a diagram depicting an example of configuration of the liquid crystal member. As depicted in FIG. 8, the liquid crystal member 13 has a silicon substrate 81, an active matrix circuit 82, aluminum electrodes 83a to 83e, an orientation layer 84, a liquid crystal molecule layer 85, an orientation layer 86, a transparent electrode 87, and a transparent substrate 88. In the incident surface of the liquid crystal member 13, each portion formed by the aluminum electrodes 83a to 83e is respectively one pixel.

The active matrix circuit 82 applies voltage to the aluminum electrodes 83a to 83e, respectively. The control circuit 17 (for example, refer to FIGS. 1 to 4) controls the voltages applied to the aluminum electrodes 83a to 83e via the active matrix circuit 82. As a result, the direction of the liquid crystal molecules in the liquid crystal molecule layer 85 changes and the refractive index of the liquid crystal member 13 to which incident light 80 is incident changes.

FIG. 9 is a diagram depicting an example of the transmittance of each position on the incident surface of the liquid crystal member. In FIG. 9, the horizontal axis represents positions on the incident surface of the liquid crystal member 13 and the vertical axis represents the refractive index of the liquid crystal member 13. An area 91 along the horizontal axis represents an area at which one light ray (for example, the incident light ray 71 depicted in FIG. 7) is incident on the surface of the liquid crystal member 13.

As depicted in FIG. 9, by providing a gradient of the voltages applied to the cells included in the area 91 and a gradient of the refractive indices (refractive index difference) of the cells included in the area 91, the reflection angle of the light from the liquid crystal member 13 can be set to an angle different from the angle at which the light is incident on the liquid crystal member 13. Further, by controlling the refractive index gradient (refractive index difference) of the cells included in the area 91, the reflection angle of the light incident on the area 91 can be controlled.

FIG. 10 is a diagram depicting an example of the reflection of light at the liquid crystal member. Incident light rays 101 to 103 depicted in FIG. 10 are light rays incident on the liquid crystal member 13. Reflected light rays 101a to 103a are higher order light rays in the reflected incident light rays 101 to 103. Reflected light rays 101b to 103b are first order light rays in the reflected incident light rays 101 to 103. By controlling the voltages applied to the pixels of the liquid crystal member 13, the reflection angles of the incident light rays 101 to 103 incident on the liquid crystal member 13 can be independently controlled, as depicted in FIG. 10.

Figure 11:
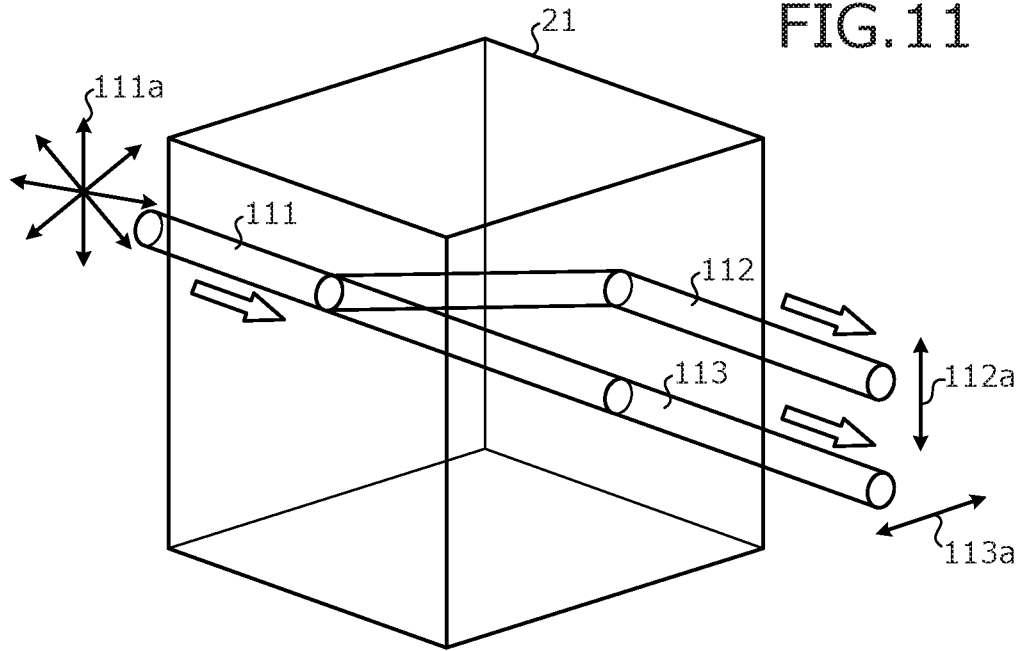
FIG. 11 is a diagram depicting an example of a polarization separating plate.

FIG. 11 is a diagram depicting an example of the polarization separating plate. In FIG. 11, a case will be described where light of random polarization is incident on the polarization separating plate 21. An incident light ray 111 represents light (of one core) incident on the polarization separating plate 21. Output light rays 112, 113 represent the light rays output from the polarization separating plate 21. A polarization direction 111a indicates the polarization direction of the incident light ray 111. As indicated by the polarization direction 111a, the incident light ray 111 is light of random polarization.

A polarization direction 112a indicates the polarization direction of the output light ray 112. As indicated by the polarization direction 112a, the output light ray 112 is linearly polarized in a vertical direction. A polarization direction 113a indicates the polarization direction of the output light ray 113. As indicated by the polarization direction 113a, the output light ray 113 is linearly polarized in a horizontal direction.

As depicted in FIG. 11, the polarization separating plate 21 separates and outputs the incident light ray 111 as the output light rays 112 and 113 whose polarization directions are orthogonal. Although description has been given in a case where light of random polarization is incident on the polarization separating plate 21, the polarization direction of the light incident on the polarization separating plate 21 is not limited to being random. For example, when light linearly polarized in a vertical direction is incident on the polarization separating plate 21, only the output light ray 112 is output, without output of the output light ray 113.

Figure 12:
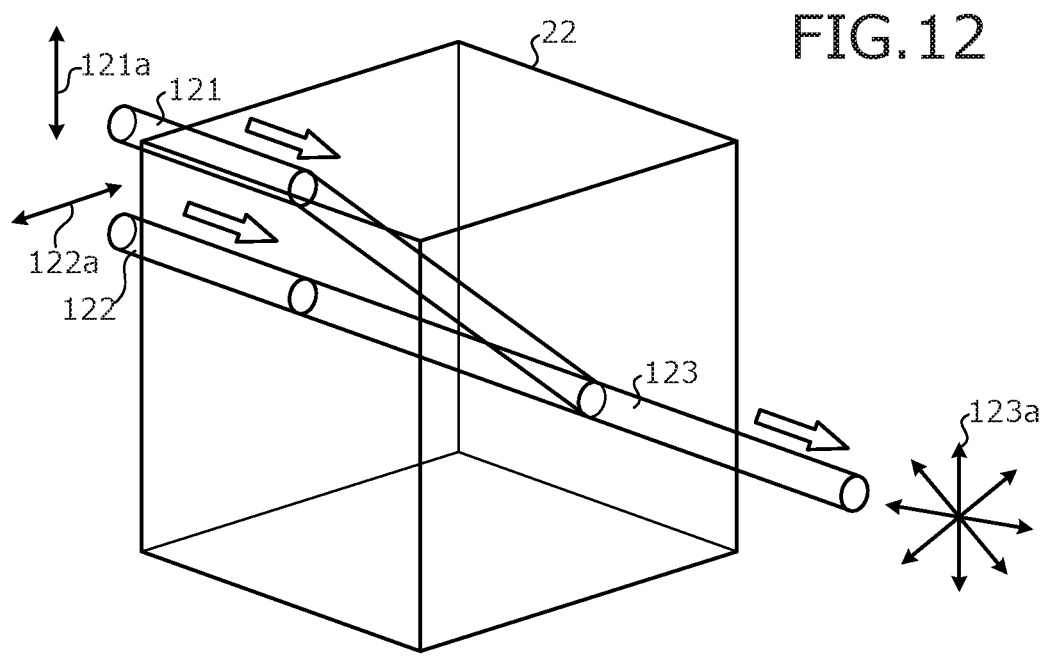
FIG. 12 is a diagram depicting an example of a polarization combining plate.

FIG. 12 is a diagram depicting an example of the polarization combining plate. In FIG. 12, incident light rays 121 and 122 represent the light rays (of one core) incident on the polarization combining plate 22. For example, the incident light rays 121 and 122 are the reflected light rays of the output light rays 112 and 113 that are depicted in FIG. 11 and reflected by the liquid crystal member 13. Output light 123 represents light output from the polarization combining plate 22.

A polarization direction 121a indicates the polarization direction of the incident light ray 121. As indicated by the polarization direction 121a, the incident light ray 121 is linearly polarized in a vertical direction. A polarization direction 122a indicates the polarization direction of the incident light ray 122. As indicated by the polarization direction 122a, the incident light ray 122 is linearly polarized in a horizontal direction. A polarization direction 123a indicates the polarization direction of the incident light ray 123. As indicated by the polarization direction 123a, the output light 123 is randomly polarized.

In this manner, the polarization combining plate 22 combines the incident light rays 121 and 122, whose polarization directions are orthogonal, and outputs the output light 123. Although the polarization combining plate 22 has been described, the same is true for the polarization combining plate 23 (for example, refer to FIGS. 2 to 4).

Figure 13:
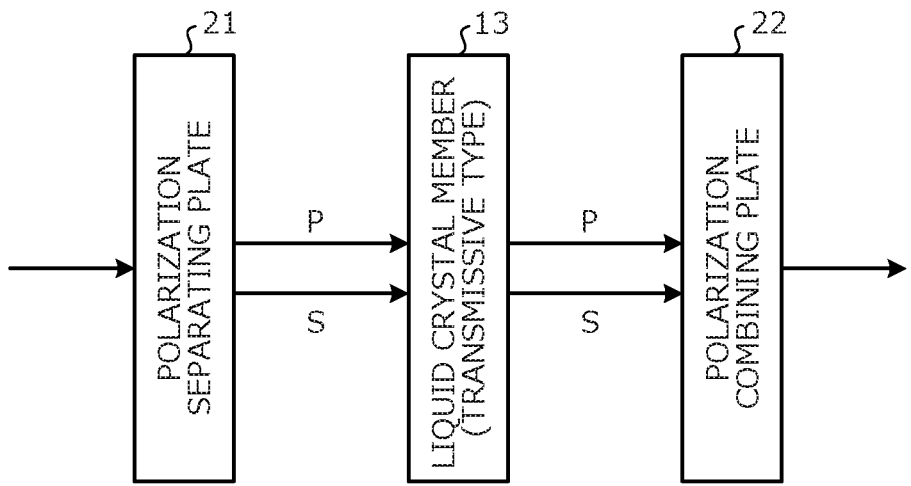
FIG. 13 is a diagram depicting an example of separation and combination of polarized wave components.

FIG. 13 is a diagram depicting an example of separation and combination of polarized wave components. In FIG. 13, although a case where the liquid crystal member 13 is transmissive (for example, refer to FIG. 4) will be described, the same is true for a case where the liquid crystal member 13 is reflective (for example, refer to FIGS. 1 to 3). As depicted in FIG. 13, the polarization separating plate 21 separates incident light into a P component and an S component having orthogonal polarization directions, and outputs the respective components to the liquid crystal member 13. The liquid crystal member 13 transmits the P component and the S component, which are respectively incident thereon at different positions, and outputs the components in variable directions. The polarization combining plate 22 combines and outputs the P component and the S component output from the liquid crystal member 13.

Figure 14:
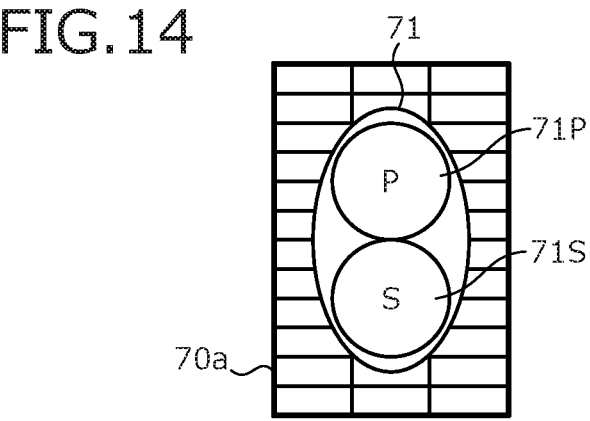
FIG. 14 is a diagram depicting an example of incidence of polarized wave components on the incident surface of the liquid crystal member.

FIG. 14 is a diagram depicting an example of incidence of polarized wave components on the incident surface of the liquid crystal member. In FIG. 14, among the liquid crystal pixels 70 of the liquid crystal member 13, the liquid crystal pixels 70a on which the incident light ray 71 is incident is depicted. An incident light ray 71P represents the P component in the incident light ray 71. An incident light ray 71S represents the S component in the incident light ray 71. As depicted in FIG. 14, polarization separation by the polarization separating plate 21 enables the incident light ray 71 to be incident on respectively differing positions of the liquid crystal pixels 70a, as the incident light ray 71P and the incident light ray 71S.

As a result, even if the polarization state of the light input to the optical attenuating apparatus 10 varies, the polarization state of the light rays incident on various positions of the liquid crystal member 13 does not vary, enabling variation of loss caused by polarized wave dependency to be suppressed.

If the refractive index of the liquid crystal pixels 70 has polarized wave dependency, for example, the refractive indices of the liquid crystal pixels on which the incident light ray 71P is incident and of the liquid crystal pixels on which the incident light ray 71S is incident among the liquid crystal pixels 70a may be independently controlled. Thus, if the refractive index of the liquid crystal pixels 70 has polarized wave dependency, even if the polarization state of the light input to the optical attenuating apparatus 10 varies, variation of loss caused by polarized wave dependency can be suppressed.

Further, if the refractive index of the liquid crystal pixels 70 has polarized wave dependency, the direction in which the refractive index gradient of the liquid crystal pixels 70a is provided may differ for the liquid crystal pixels on which the incident light ray 71P is incident and the liquid crystal pixels on which the incident light ray 71S is incident.

Figure 15:
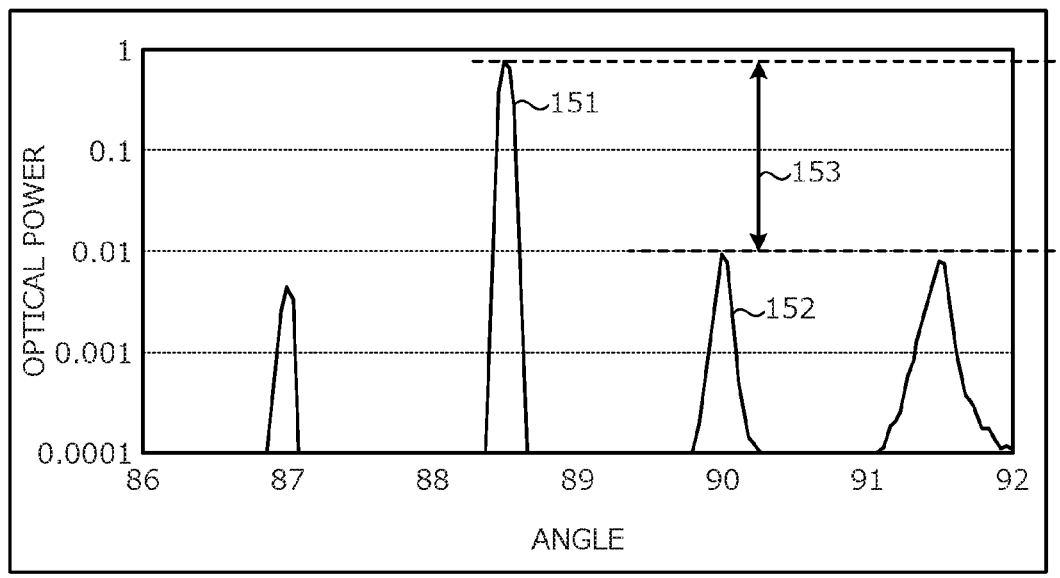
FIG. 15 is a diagram depicting an example of a relation of power and angle of the light rays output from the liquid crystal member.

FIG. 15 is a diagram depicting an example of the relationship of power and the angle of the light rays output from the liquid crystal member. In FIG. 15, the horizontal axis represents the angle of the light rays output from the liquid crystal member 13 and the vertical axis represents the power (optical power) of the light rays output from the liquid crystal member 1.

A first order light ray 151 is a first order light ray among the light rays output from the liquid crystal member 13. A second order light ray 152 is a second order light ray among the light rays output from the liquid crystal member 13. A power ratio 153 is power ratio of the first order light ray 151 and the second order light ray 152 (higher order light ray).

Figure 16:
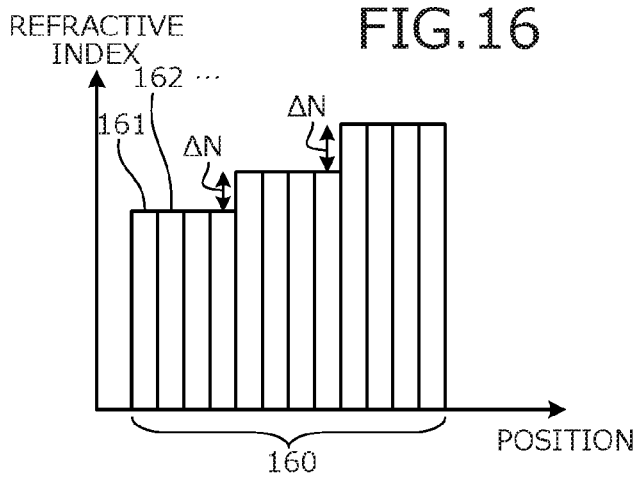
FIG. 16 is a diagram depicting an example of control of the transmittance of each position on the incident surface of the liquid crystal member.

FIG. 16 is a diagram depicting an example of control of the transmittance of each position on the incident surface of the liquid crystal member. In FIG. 16, the horizontal axis represents positions on the incident surface of the liquid crystal member 13; and the vertical axis represents the refractive index of the liquid crystal member 13. An area 160 represents an area on the incident surface of the liquid crystal member 13, and on which one light ray (for example, the incident light ray 71 depicted in FIG. 7) is incident.

Refractive indices 161, 162, . . . are the respective refractive indices of neighboring first, second, . . . pixels in the area 160. As depicted in FIG. 16, the refractive indices of the neighboring first, second, . . . pixels do not all have to differ and it suffices for a refractive index gradient (refractive index difference) to be provided in the area 160. In the example depicted in FIG. 16, the voltage applied to the pixels in the area 160 is controlled to such that for every four pixels, the refractive index difference increases by ΔN.

A power ratio 153 of the first order light ray 151 and the second order light ray 152 (higher order light ray) depicted in FIG. 15 can be adjusted by the refractive index difference ΔN. For example, the power ratio 153 of the first order light ray 151 and the second order light ray 152 (higher order light rays) can be properly adjusted by controlling the refractive index difference ΔN corresponding to the sensitivity of the light receiving unit 16.

Figure 17:
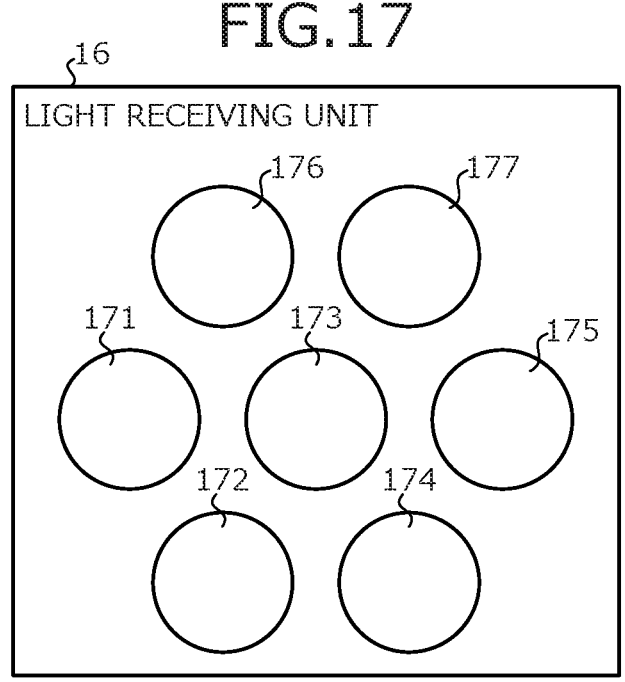
FIG. 17 is a diagram depicting an example of an incident surface of a light receiving unit.

FIG. 17 is a diagram depicting an example of the incident surface of the light receiving unit. Light receiving elements 171 to 177, for example, are provided on the light receiving surface of the light receiving unit 16. High order reflected light rays of the incident light rays 71 to 77 depicted in FIG. 7, for example, are incident on the light receiving elements 171 to 177. The light receiving elements 171 to 177 output to the control circuit 17, signals corresponding to the power of the light rays respectively incident on the light receiving elements 171 to 177.

Figure 18:
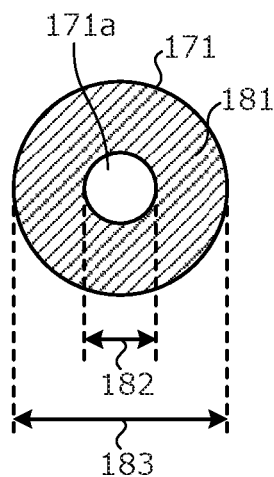
FIG. 18 is a diagram depicting an example of a light receiving surface of a light receiving element.

FIG. 18 is a diagram depicting an example of the light receiving surface of the light receiving element. In FIG. 18, although the light receiving surface of the light receiving element 171 is described, the same is true for the light receiving elements 172 to 177. As depicted in FIG. 18, a slit 181 that blocks light may be provided in the light receiving surface of the light receiving element 171. A light receiving unit 171a is a portion of the light receiving surface of the light receiving element 171 exposed from the slit 181.

A light receiving diameter 183 of the light receiving element 171 is larger than the beam diameter of the incident higher order light rays, and the slit 181 is provided such that with respect to the light receiving diameter 183, only the light receiving unit 171a of the light receiving element 171 receives light. A light receiving diameter 182 of the light receiving unit 171a, for example, can be about the size of the beam diameter of the incident higher order light rays.

In this manner, the mutual relation between the second fiber 15 optical connection efficiency of the first order light rays output from the liquid crystal member 13 and the light receiving unit 16 optical connection efficiency of the higher order light rays output from the liquid crystal member 13 is enhanced by providing a blocking unit that reduces the light receiving diameter of the higher order light rays at the light receiving element 171. As a result, the output power from the second fiber 15 can be monitored more accurately based on the signal output from the light receiving unit 16.

Figure 19:
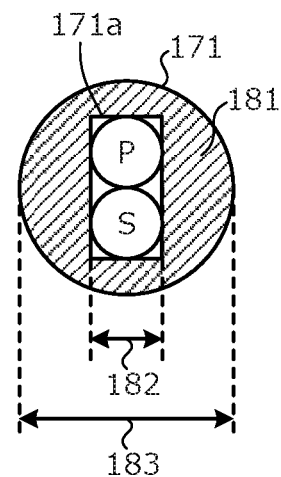
FIG. 19 is a diagram depicting another example of the light receiving surface of the light receiving element.

FIG. 19 is a diagram depicting another example of the light receiving surface of the light receiving element. In FIG. 19, portions identical to those depicted in FIG. 18 are given the same reference numerals used in FIG. 18 and description thereof is omitted hereinafter. For example, in a case of a configuration in which the polarization combining plate 23 is omitted from the configurations depicted in FIGS. 2 to 4, light that has been separated into the P component and the S component is incident on the light receiving element 171. Therefore, the slit 181 may be shaped such that the separated incident P and S components are received by the light receiving unit 171a as depicted in FIG. 19.

Figure 20:
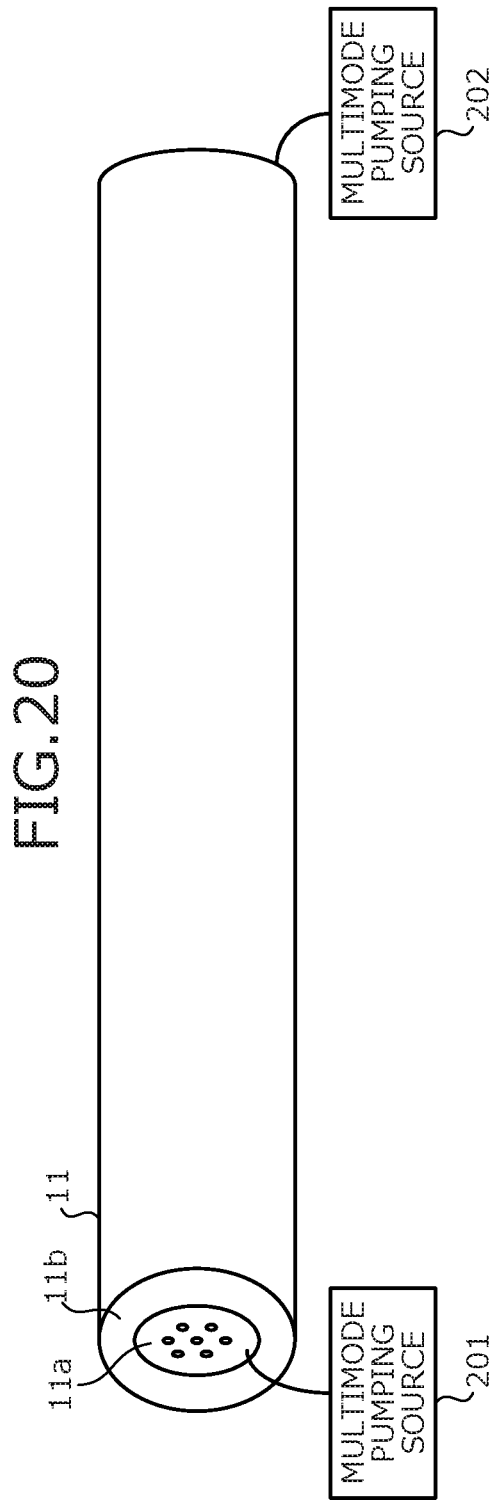
FIG. 20 is a diagram depicting an example of the first fiber used as an amplifying medium.

FIG. 20 is a diagram depicting an example of the first fiber used as an amplifying medium. In FIG. 20, portions identical to those depicted in FIG. 5 are given the same reference numerals used in FIG. 5 and description thereof is omitted hereinafter. In FIG. 20, the reference numerals of the cores 51 to 57 are omitted.

As depicted in FIG. 20, a multimode pumping source 201 may be provided at the input end of the first fiber 11. The multimode pumping source 201 generates multimode pump light that is injected into the first cladding 11a of the first fiber 11 in a co-propagating direction. As a result, in the first cladding 11a, the pump light is propagated by multimode in the same direction as signal light and the signal light propagated by the cores 51 to 57 can be amplified.

A multimode pumping source 202 may be provided at the output end of the first fiber 11. The multimode pumping source 202 generates multimode pump light that is injected into the first cladding 11a of the first fiber 11 in a counter propagating direction. As a result, in the first cladding 11a, the pump light is propagated by multimode in the opposite direction of the signal light and the signal light propagated by the cores 51 to 57 can be amplified.

The multimode pumping sources 201 and 202 may be, for example, laser diodes (LD) that generate pump light of a wavelength of 0.98[μm]. Further, like the first fiber 11, the second fiber 15 may also be configured to receive injection of pump light as an EDF. As a result, the first fiber 11 and the second fiber 15 can be used respectively as Erbium doped fiber amplifiers (EDFA), enabling a configuration in which a variable optical attenuator (VOA) is provided between the two EDFAs.

In FIG. 20, although a configuration of bidirectional pumping is described, configuration may be for co-propagating or counter propagating alone. In other words, the configuration may omit any one among the multimode pumping sources 201 and 202.

Figure 21:
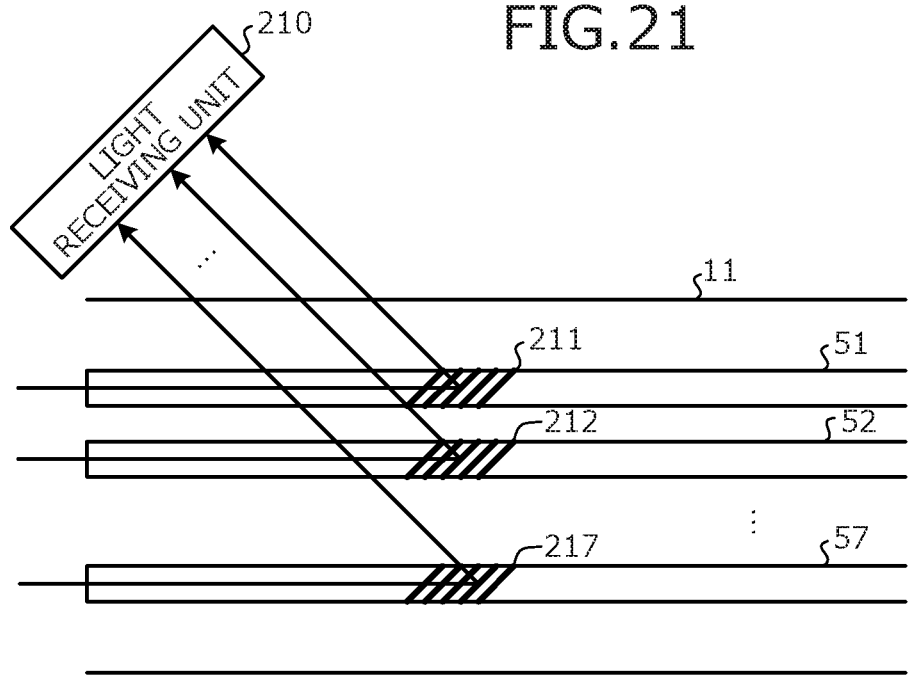
FIG. 21 is a diagram depicting an example of a configuration for measuring optical power in the first fiber.

FIG. 21 is a diagram depicting an example of a configuration for measuring optical power in the first fiber. As depicted in FIG. 21, for example, diffraction gratings 211 to 217 may be respectively provided near the input ends of the cores 51 to 57 of the first fiber 11.

The diffraction gratings 211 to 217, for example, can be formed by exposing the cores 51 to 57 to ultraviolet rays to cyclically vary the refractive index along the longitudinal direction of the cores 51 to 57. By forming the diffraction gratings 211 to 217 such that the surface of the diffraction gratings 211 to 217 are oblique to the travelling direction of the signal light, light of a specific wavelength included in the signal light can be reflected and output at a given angle to a destination outside the core.

For example, the diffraction grating 211 branches light of a specific wavelength in the signal light propagated by the core 51 and outputs the branched light from a surface thereof on the first fiber 11 side. Similarly, the diffraction gratings 212 to 217 respectively branch light of a specific wavelength in the signal light propagated by the cores 52 to 57 and output the branched light from the surface thereof on the first fiber 11 side.

A light receiving unit 210 is provided at a position that receives the light reflected by the diffraction gratings 211 to 217 and output to destination outside the first fiber. The light receiving unit 210 receives light rays output from the incident light ray 111 and outputs signals that correspond to the power of the received light rays. As a result, the power of the light rays near the input end of the first fiber 11 can be monitored.

The light receiving unit 210, for example, has plural light receiving elements that receive the light rays that are reflected by the diffraction gratings 211 to 217 and output to a destination outside the first fiber 11.

Alternatively, the light receiving unit 210 may have one light receiving element that collectively receives the light rays reflected by the diffraction gratings 211 to 217 and outputs the light rays to a destination outside the first fiber 11. In this case, for example, the light rays propagated by the cores 51 to 57 are intensity modulated by respectively different low frequencies f1 to f7 and configuration may be such that the signal obtained by the one light receiving element of the light receiving unit 210 is subject to digital conversion and fast Fourier transform (FFT) conversion and the power of the low frequency components (f1 to f7) included in the light rays propagated by the cores 51 to 57 is detected. Thus, even if the light receiving unit 210 is configured to have only one light receiving element, the power of the light rays of the cores, near the input end of the first fiber 11 can be monitored.

The digital conversion, for example, can be performed by an analog/digital converter (ADC). The FFT conversion, for example, can be performed by a field programmable gate array (FPGA) or a central processing unit (CPU).

Further, the configuration may further include a circuit that with respect to the signal obtained by the one light receiving element of the light receiving unit 210, performs synchronous detection by the low frequencies f1 to f7, to achieve a configuration that detects the power of the low frequency components (f1 to f7) included in the light rays propagated by the cores 51 to 57. As a result, even when the light receiving unit 210 is configured to have only one light receiving element, the power of the light of the cores can be monitored near the input end of the first fiber 11.

The wavelengths of the light rays reflected by the diffraction gratings 211 to 217 and output to a destination outside the first fiber 11 can be adjusted by the interval of the diffraction gratings 211 to 217. Further, the wavelengths of the light rays reflected by the diffraction gratings 211 to 217 and output to a destination outside the first fiber 11 may be wavelengths of a bandwidth that is resistant to gain variations even when transmission conditions change such as a change in the wavelength count of the wavelength multiplexed light. As a result, gain can be stabilized to perform monitoring even when transmission conditions change such as a change in the wavelength count of the wavelength multiplexed light.

Further, the light rays reflected by the diffraction gratings 211 to 217 and output to a destination outside the first fiber 11 may be amplified spontaneous emission (ASE) components included in the wavelength multiplexed light propagated by the cores 51 to 57. As a result, deterioration of the transmission quality of a main signal included in the wavelength multiplexed light propagated by the cores 51 to 57 can be suppressed.

The light rays reflected by the diffraction gratings 211 to 217 and output to a destination outside of the first fiber 11 may be a main signal included in the wavelength multiplexed light propagated by the cores 51 to 57. In this case, for example, the main signals reflected by the diffraction gratings 211 to 217 and output to a destination outside the first fiber 11 may be light of a narrow bandwidth (e.g., about 0.1 [nm]) (for example, refer to FIG. 27). As a result, deterioration of the transmission quality of the main signals included in the wavelength multiplexed light propagated by the cores 51 to 57 can be suppressed.

Although a configuration that includes the light receiving unit 210 and the diffraction gratings 211 to 217 near the input end of the first fiber 11 has been described, the configuration may include the light receiving unit 210 and the diffraction gratings 211 to 217 near the output end of the first fiber 11. As a result, the power of the light rays of the cores can be monitored near the output end of the first fiber 11. Further, the configuration may include the light receiving unit 210 and the diffraction gratings 211 to 217 near the input end and the output end of the first fiber 11. As a result, the power of the light rays of the cores can be monitored near the input end and the output end of the first fiber 11, enabling the gain of the light rays in the first fiber 11 to be monitored.

Thus, at the cores 51 to 57 of the first fiber 11, the diffraction gratings 211 to 217 may be provided that reflect light of a specific wavelength of the light propagated by the cores 51 to 57 and output the light to a destination outside the first fiber 11. Furthermore, by providing the light receiving unit 210 that receives the light output to a destination outside the first fiber 11 by the diffraction gratings 211 to 217, the power of the light propagated by the cores of the first fiber 11 can be monitored. For example, in a configuration that uses a conventional fused branch/coupler to branch light, branching of the light of the cores 51 to 57, which are adjacent to one another, is difficult. However, use of the diffraction gratings 211 to 217 enables the power of the light propagated by the cores of the first fiber 11 to be monitored.

For example, the light receiving unit 210 outputs to the control circuit 17, a signal that corresponds to the power of the received light. As a result, the control circuit 17 can control the liquid crystal member 13, based on both the power of the light propagated by the first fiber 11 and the power of the light output from the second fiber 15.

Figure 22:
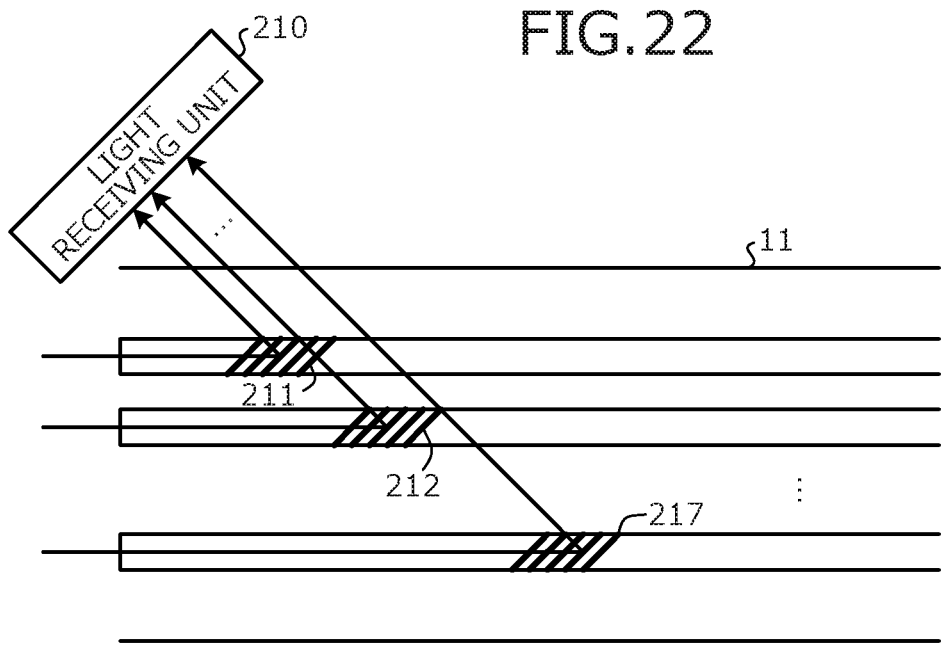
FIG. 22 is a diagram depicting another example of the configuration for measuring the optical power in the first fiber.

FIG. 22 is a diagram depicting another example of the configuration for measuring the optical power in the first fiber. In FIG. 22, portions identical to those depicted in FIG. 21 are given the same reference numerals used in FIG. 22 and description thereof is omitted hereinafter. As depicted in FIG. 22, the diffraction gratings 211 to 217 may be provided at respectively different positions along the optical transmission direction of the first fiber 11.

For example, using an excimer laser to shoot at the cores 51 to 57 respectively enables the diffraction gratings 211 to 217 to be provided at arbitrary positions, respectively. Alternatively, the diffraction gratings 211 to 217 may be formed such that the surfaces thereof are respectively at different angles.

As a result, the light rays reflected by the diffraction gratings 211 to 217 can be brought in proximity of each other, facilitating a reduction in the size of the light receiving unit 210. Alternatively, the light rays reflected by the diffraction gratings 211 to 217 can be distanced from one another. Consequently, in a configuration where the light receiving unit 210 receives light rays by plural light receiving elements, the light rays can be distanced from one another corresponding to the interval at which the light receiving elements can be disposed.

Thus, by respectively adjusting the angles and the positions of the diffraction gratings 211 to 217 in the light propagation direction of the first fiber 11, optical paths of monitored light rays output from the first fiber 11 can be adjusted.

Figure 23:
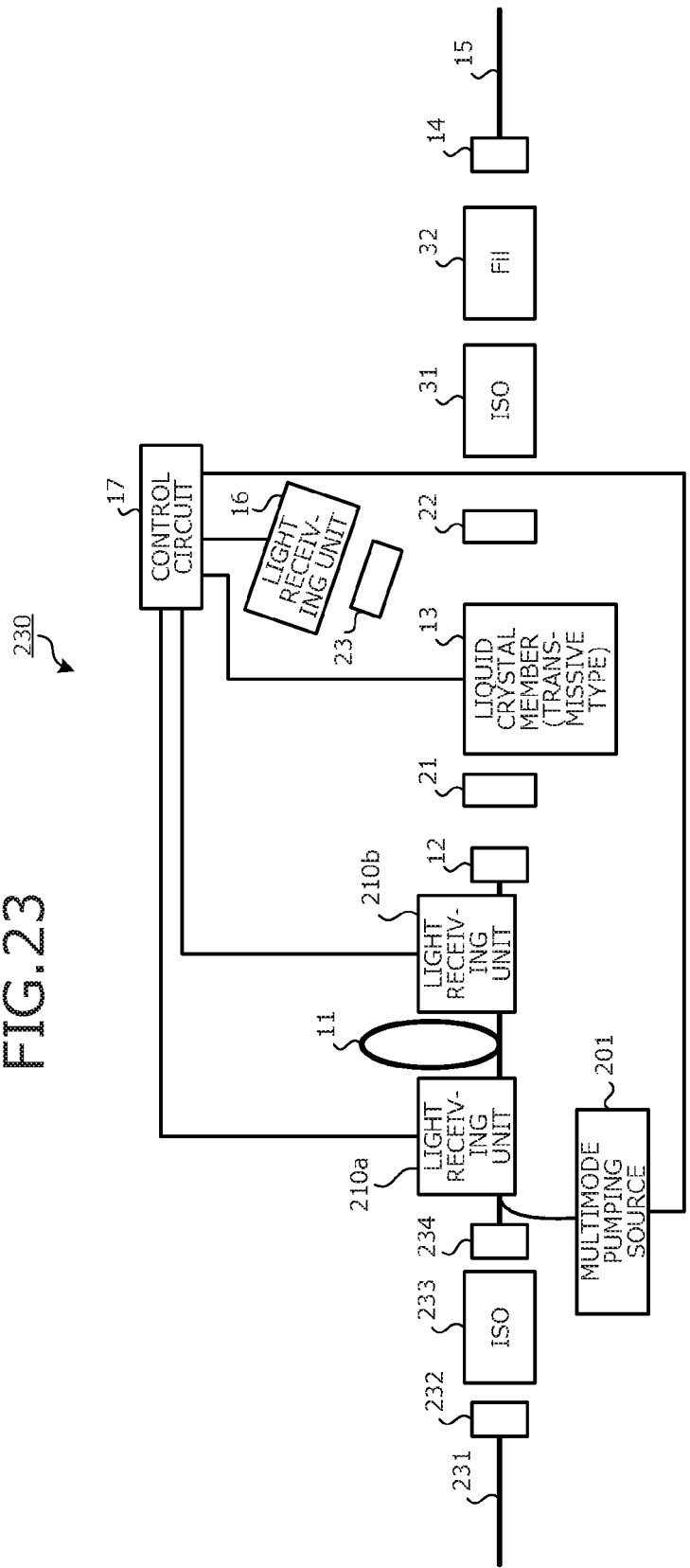
FIG. 23 is a diagram depicting an example of a configuration of an optical amplifying apparatus to which the optical attenuating apparatus is applied.

FIG. 23 is a diagram depicting an example of a configuration of an optical amplifying apparatus to which the optical attenuating apparatus is applied. In FIG. 23, portions identical to those depicted in FIGS. 4, 20, and 21 are given the same reference numerals used in FIGS. 4, 20, and 21, and description thereof is omitted hereinafter.

As depicted in FIG. 23, an optical amplifying apparatus 230 includes an input fiber 231, a lens 232, an isolator 233, a lens 234, the first fiber 11, the multimode pumping source 201, light receiving units 210a and 210b, the microlens 12, the polarization separating plate 21, the liquid crystal member 13, the polarization combining plate 22, the isolator 31, the optical filter 32 (Fil), the microlens 14, the second fiber 15, the polarization combining plate 23, the light receiving unit 16, and the control circuit 17.

The input fiber 231, for example, is a multicore fiber having plural cores and is capable of transmitting plural light rays simultaneously. The input fiber 231 outputs to the lens 232, light rays transmitted by the cores. The lens 232 outputs to the isolator 233, the light rays output from the input fiber 231.

The isolator 233 transmits to the lens 234, the light rays output from the input fiber 231, and blocks light output from the lens 234 side. The lens 234 outputs to the first fiber 11, the light rays output from the isolator 233.

The multimode pumping source 201 is provided near the input end of the first fiber 11, which is used as an amplifying medium (for example, refer to FIG. 20). Further, near the input end of the first fiber 11, a diffraction grating (for example, refer to FIGS. 21 and 22) is provided and the light receiving unit 210a is provided at a position that receives the light output from the first fiber 11 by the diffraction grating. Near the output end of the first fiber 11, a diffraction grating (for example, refer to FIGS. 21 and 22) is provided and the light receiving unit 210b is provided at a position that receives the light output from the first fiber 11 by diffraction grating.

The light receiving units 210a and 210b, for example, are respectively configured identically to the light receiving unit 210 depicted in FIGS. 21 and 22. The light receiving units 210a and 210b respectively output to the control circuit 17, a signal that indicates the power of the received light. Thus, in the control circuit 17, the input power to the first fiber 11 and the output power can be monitored.

The microlens 12, the polarization separating plate 21, the liquid crystal member 13, the polarization combining plate 22, the isolator 31, the optical filter 32, the microlens 14, the second fiber 15, the polarization combining plate 23, the light receiving unit 16, and the control circuit 17, for example, are identical to the configuration depicted in the FIG. 4. Nonetheless, the configuration of the optical amplifying apparatus 230 is not limited hereto and, for example, can adopt the optical attenuating apparatus 10 that includes the liquid crystal member 13, which is a reflective type, depicted in FIGS. 1 to 3.

Further, in FIG. 23, although a configuration has been described in which the optical attenuating apparatus 10 is applied downstream from the amplifying medium using the first fiber 11, the optical attenuating apparatus 10 can be applied upstream from or at an intermediate stage of the amplifying medium using the first fiber 11.

The optical amplifying apparatus 230 enables the light rays input from the input fiber 231 to be collectively amplified at the first fiber 11 and enables the attenuation of the light rays to be individually controlled by the liquid crystal member 13. Further, the higher order reflected light rays from the liquid crystal member 13 are received by the light receiving unit 16, whereby, for example, compared to a configuration that removes a portion of the light rays output from the second fiber 15, drops in the power of the light rays output from the second fiber 15 can be suppressed. Therefore, for example, the power of the pump light generated by the multimode pumping source 201 can be reduced, facilitating reduced power consumption.

Further, configuration may be such that the multimode pumping source 201 is controlled by the control circuit 17. For example, in a case where the control circuit 17 senses from an input monitoring result of the light receiving unit 210a, that input light has not been input, the output of the pump light by the multimode pumping source 201 may be suspended.

Figure 24:
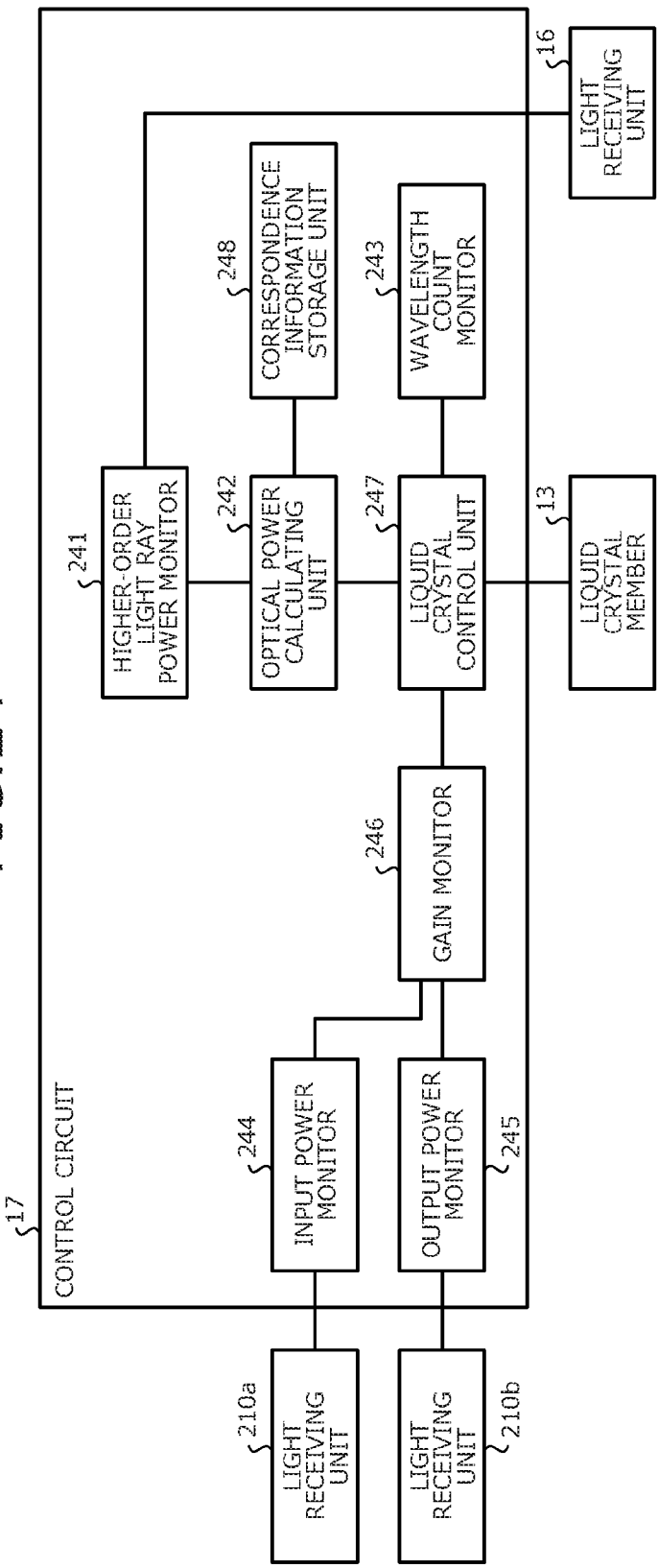
FIG. 24 is a diagram depicting an example of configuration of a control circuit.

FIG. 24 is a diagram depicting an example of configuration of the control circuit. As depicted in FIG. 24, the control circuit 17 includes a higher-order light ray power monitor 241, an optical power calculating unit 242, a wavelength count monitor 243, an input power monitor 244, an output power monitor 245, a gain monitor 246, a liquid crystal control unit 247, and a correspondence information storage unit 248.

The higher-order light ray power monitor 241 monitors based on the signals output from the light receiving unit 16, the power of the higher order light rays of the light rays corresponding to the cores and output from the liquid crystal member 13. The higher-order light ray power monitor 241 notifies the optical power calculating unit 242 of the power of the higher order light rays of the light rays that correspond to the monitored cores.

The optical power calculating unit 242 respectively calculates based on the power notified by the higher-order light ray power monitor 241, the power of the light rays output from the second fiber 15. The optical power calculating unit 242 outputs the calculated power of the light rays to the liquid crystal control unit 247.

For example, the correspondence information storage unit 248 stores correspondence information of the power of the higher order light rays monitored by the higher-order light ray power monitor 241 and the power of the light output from the second fiber 15. For example, the correspondence information can be created in advance by measuring the power of the higher order light rays monitored by the higher-order light ray power monitor 241 and the power of the light output from the second fiber 15 while varying the voltage applied to the liquid crystal member 13.

The correspondence information, for example, is a function by which the power of the light output from the second fiber 15 can be calculated from the power of the higher order light rays monitored by the higher-order light ray power monitor 241. Alternatively, the correspondence information may be a table that indicates combinations of the power of the higher order light rays monitored by the higher-order light ray power monitor 241 and the power of the light output from the second fiber 15. The optical power calculating unit 242 respectively derives the power of the light rays output from the second fiber 15, based on the power of the higher order light rays of the light rays that correspond to the cores, the power of the higher order light rays being notified by the higher-order light ray power monitor 241 based on the correspondence information stored in the correspondence information storage unit 248.

The wavelength count monitor 243 monitors the wavelength count (multiplexed wavelength count) of the wavelengths included in the signal light input to each core of the first fiber 11. For example, the optical power calculating unit 242 monitors the wavelength count based on a supervisory (SV) signal received from an optical communications apparatus upstream. The wavelength count monitor 243 notifies the liquid crystal control unit 247 of the monitored wavelength count.

The input power monitor 244 monitors for each core of the first fiber 11 and based on the signals output from the light receiving unit 210a depicted in FIG. 23, the power (input power) of the signal light input to the first fiber 11. The input power monitor 244 notifies the gain monitor 246 of the monitored input power. The output power monitor 245 monitors for each core of the first fiber 11 and based on the signals output from the light receiving unit 210b depicted in FIG. 23, the power (output power) of the signal light output from the first fiber 11. The output power monitor 245 notifies the gain monitor 246 of the monitored output power.

For each core of the first fiber 11, the gain monitor 246 monitors based on the input power notified by the input power monitor 244 and the output power notified by the output power monitor 245, the gain of the signal light at the first fiber 11. The gain monitor 246 notifies the liquid crystal control unit 247 of the monitored gain.

The liquid crystal control unit 247 controls for each core and based on the power notified by the optical power calculating unit 242, the voltage applied to the pixels of the liquid crystal member 13. As a result, for each core and based on monitoring results of the power of the higher order light rays having a correlation with the power of the signal light output from the second fiber 15, constant output control can be performed in controlling the power of the signal light output from the second fiber 15.

For example, the liquid crystal control unit 247 controls the voltage applied to the liquid crystal member 13 such that for each core, the power notified by the optical power calculating unit 242 becomes a target value that corresponds to the wavelength count notified by the wavelength count monitor 243. As a result, even if the wavelength count of the signal light propagated by the cores changes, the output power per single wavelength can be controlled to be a given value.

Further, the liquid crystal control unit 247 controls for each core and based in the gain notified by the gain monitor 246, the voltage applied to the pixels of the liquid crystal member 13. As a result, for each core and based on monitoring results of the power of the higher order light rays linked to the power of the signal light output from the second fiber 15, constant gain control can be performed in controlling the gain of the signal light output from the second fiber 15.

Further, the liquid crystal control unit 247 may perform a combination of constant output control and constant gain control. For example, pump light is excessively injected into the first fiber 11 by double cladding pumping and inverse distribution of the EDF is completely formed, maximally fixing gain. A state in which gain is maximally fixed, for example, can be confirmed by the gain monitor 246. Further, even if input conditions of the optical amplifying apparatus 230 change, wavelength characteristics of gain can be held constant while for each core, output can be controlled to be a given value by controlling the liquid crystal member 13 by the liquid crystal control unit 247 based on monitoring results from the wavelength count monitor 243.

The control circuit 17, for example, can be implemented by a computing circuit such as a FPGA and a digital signal processor (DSP).

The input power monitored by the input power monitor 244 and/or the output power monitored by the output power monitor 245 can be used for startup (for example, ASE startup) of the optical amplifying apparatus 230 and/or a monitoring alarm for the input light.

Further, for example, a control unit that controls the multimode pumping source 201 based on an input monitoring result of the light receiving unit 210*a* may be provided in the control circuit 17.

Figure 25:
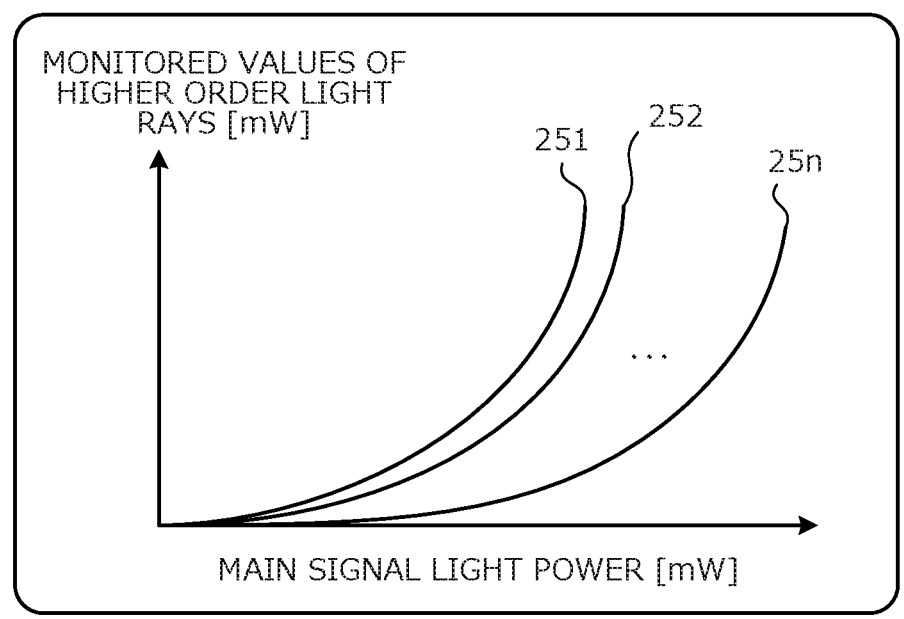
FIG. 25 is a diagram depicting an example of a relation of main signal light power and monitored values of higher order light rays.

FIG. 25 is a diagram depicting an example of a relation of main signal light power and monitored values of higher order light rays. In FIG. 25, the horizontal axis represents the optical power (main signal light power) [mW] of the signal light output from the second fiber 15; and the vertical axis represents monitored values (monitored values of higher order light rays) [mW] obtained by the higher-order light ray power monitor 241.

Curves 251 to 25*n* respectively correspond to a first core, a second core, . . . , n-th core and characterize the relation of the optical power of the signal light output from the second fiber 15 and the monitored values obtained by the higher-order light ray power monitor 241. The correspondence information stored in the correspondence information storage unit 248 depicted in FIG. 24, for example, is correspondence information representing the curves 251 to 25*n*.

By referring to the correspondence information that represents the curves 251 to 25*n*, the optical power calculating unit 242 can derive based on the monitored values obtained by the higher-order light ray power monitor 241, the optical power of the signal light output from the second fiber 1.

In the liquid crystal member 13, when the direction of the first order light ray θ varies, the direction of the higher order light rays can be thought to nθ vary. Therefore, as indicated by the curves 251 to 25*n*, the optical power of the signal light output from the second fiber 15 and the monitored value obtained by the higher-order light ray power monitor 241 come to have an exponential relation and not a proportional relation.

In contrast, the control circuit 17 stores and refers to the correspondence information that is based on actual measured values of the optical power of the signal light output from the second fiber 15 and the monitored values (light receiving results of the light receiving unit 16) obtained by the higher-order light ray power monitor 241. As a result, the optical power of the signal light output from the second fiber 15 can be accurately derived based on the monitored values obtained by the higher-order light ray power monitor 241.

Figure 26:
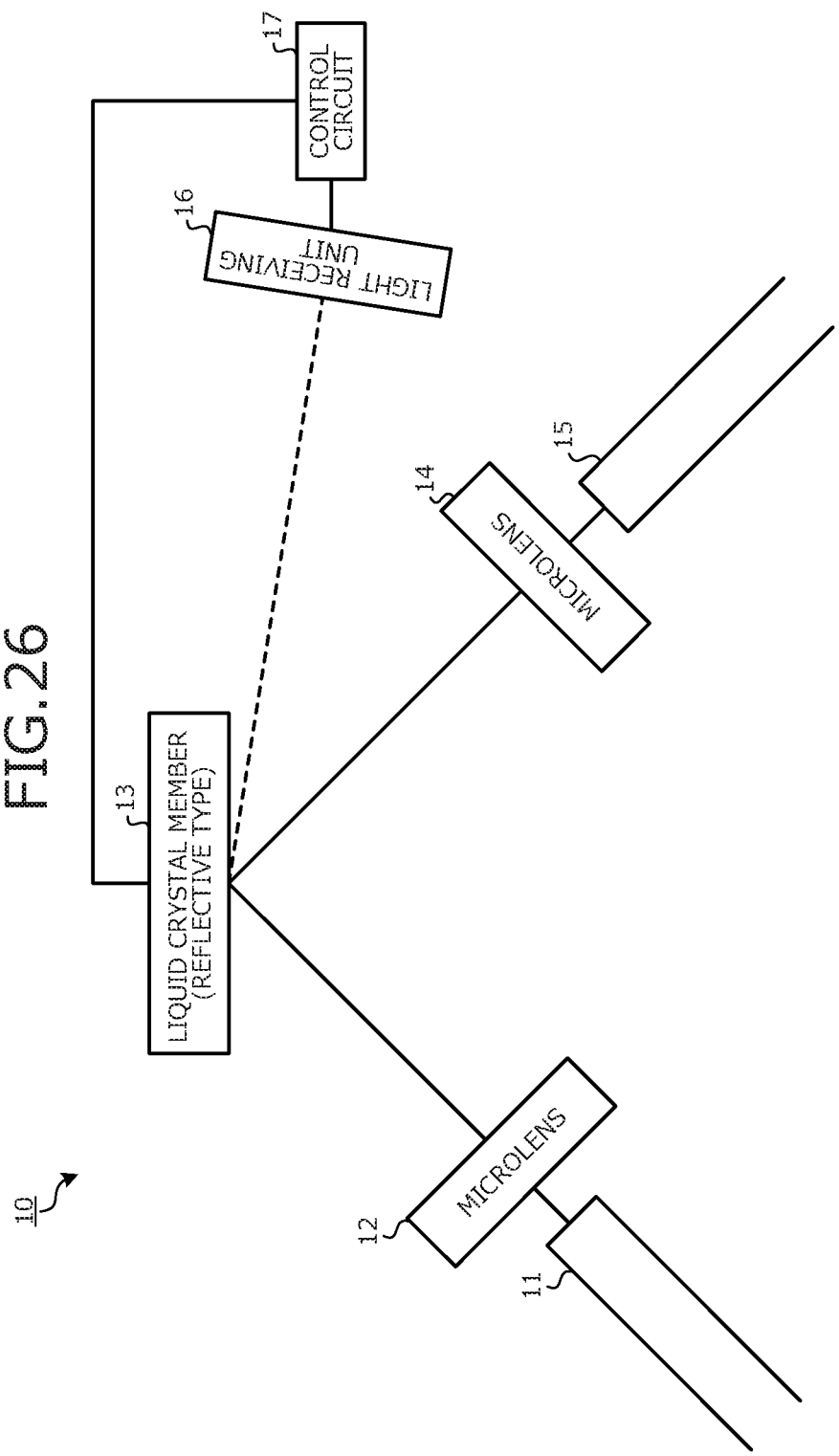
FIG. 26 is a diagram depicting a fifth configuration example of the optical attenuating apparatus according to the embodiment.

FIG. 26 is a diagram depicting a fifth configuration example of the optical attenuating apparatus according to the embodiment. In FIG. 26, portions identical to those depicted in FIG. 1 are given the same reference numerals used in FIG. 1 and description thereof is omitted hereinafter. The first fiber 11 and the second fiber 15 may be respectively a single core fiber.

In this case as well, the power of light rays can be individually controlled by reflecting the light from the first fiber 11 by the liquid crystal member 13 to vary the efficiency of the optical connection to the second fiber 15. Monitoring of the output power further becomes possible by optically receiving the higher order light rays output from the liquid crystal member 13. By monitoring the higher order light rays output from the liquid crystal member 13, unfavorable effects on the light output from the second fiber 15 can be suppressed and the power of the light output form the second fiber 15 can be monitored. Further, since configuration to remove a portion of the light output from the second fiber 15 need not be provided, size reductions of the apparatus can be facilitated.

Thus, the optical attenuating apparatus 10 can efficiently control the attenuation of light even when the first fiber 11 and the second fiber 15 are respectively a single core fiber. For example, in the optical attenuating apparatus 10 depicted in FIGS. 2 to 4 and the optical amplifying apparatus 230 depicted in FIG. 23 as well, the multicore fibers may similarly be replaced with single core fibers.

FIG. 27 is a diagram depicting an example of bandwidth for monitoring optical power in the first fiber. In FIG. 27, the horizontal axis represents the wavelength [nm] of the light; and the vertical axis represents the power of the light (optical power) [dBm]. Signal light rays Ps1 to Ps9 are main signals included in the wavelength multiplexed light propagated in one core of the first fiber 11. Further, the wavelength multiplexed light propagated in the one core of the first fiber 11 includes an ASE component 271.

For example, a component of the signal light ray Ps1 having the shortest wavelength among the signal light rays Ps1 to Ps9 is in a bandwidth 272 on the short wavelength side, and can be reflected by the diffraction gratings 211 to 217 depicted in FIGS. 21 and 22 to be monitored by the light receiving unit 210. Alternatively, a component of the signal light ray Ps9 having the longest wavelength among the signal light rays Ps1 to Ps9 is in a bandwidth 273, and may be reflected by the diffraction gratings 211 to 217 depicted in FIGS. 21 and 22 to be monitored by the light receiving unit 210.

The bandwidths 272 and 273 are narrow bandwidths of about 0.1 [nm], for example. As a result, unfavorable effects on the signal light rays Ps1 to Ps9 can be suppressed and the power of the wavelength multiplexed light propagated in the one core of the first fiber 11 can be monitored.

As described, the optical device enables attenuation to be efficiently controlled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical device comprising:
   a first fiber that is a multicore fiber configured to have a plurality of cores from which signal lights are output, respectively;
   a liquid crystal member configured to have a reflection surface with liquid crystal pixels that reflect light, wherein the liquid crystal member reflects the signal lights output from the first fiber at different areas of the reflection surface, respectively;
a second fiber that is a multicore fiber configured to have a plurality of cores to which first order light rays in the reflected lights are optically connected, respectively;
a plurality of light receiving circuits configured to receive higher order light rays in the reflected lights, respectively; and
a control circuit configured to control based on a light receiving result of the light receiving circuits, efficiency of optical connection of the first order light rays to the cores of the second fiber, by varying for each area an angle of the reflected light.

* * * * *